US012693541B2

(12) United States Patent　　(10) Patent No.: US 12,693,541 B2
Hirata et al.　　(45) Date of Patent: Jul. 28, 2026

(54) INFORMATION DISPLAY APPARATUS AND SPATIAL SENSING APPARATUS

(71) Applicant: MAXELL, LTD., Kyoto (JP)

(72) Inventors: Koji Hirata, Kyoto (JP); Koji Fujita, Kyoto (JP); Eiji Takagi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/522,958

(22) Filed: Nov. 29, 2023

(65) Prior Publication Data

US 2024/0092172 A1　　Mar. 21, 2024

Related U.S. Application Data

(63) Continuation of application No. 16/754,764, filed as application No. PCT/JP2018/037459 on Oct. 5, 2018, now Pat. No. 11,878,586.

(30) Foreign Application Priority Data

Oct. 24, 2017　(JP) ................................. 2017-205299

(51) Int. Cl.
　*G02B 27/01*　　(2006.01)
　*B60K 35/10*　　(2024.01)
　　　　(Continued)

(52) U.S. Cl.
　CPC .......... *G02B 27/0179* (2013.01); *B60K 35/10* (2024.01); *B60K 35/235* (2024.01);
　　　　(Continued)

(58) Field of Classification Search
　None
　See application file for complete search history.

(56) References Cited

U.S. PATENT DOCUMENTS 4,961,625 A　　10/1990　Wood
11,878,586 B2 *　1/2024　Hirata ..................... G06F 3/011
　　　　(Continued)

FOREIGN PATENT DOCUMENTS

JP　　2000-168352 A　　6/2000
JP　　　2010-18201 A　　1/2010
　　　　(Continued)

OTHER PUBLICATIONS

International Search Report of PCT/JP2018/037459 dated Dec. 11, 2018.

(Continued)

*Primary Examiner* — Christopher R Lamb
(74) *Attorney, Agent, or Firm* — MATTINGLY & MALUR, PC

(57)　　　　　ABSTRACT

An information display apparatus and a spatial sensing apparatus for the information display apparatus are provided, the information display apparatus enabling the selection/change of the lot of display images in small point-of-view motion so that an interactive function for a driver is achieved. An information display apparatus displaying information onto a vehicle includes: an information display apparatus displaying image information onto an image display region on a forward part of a driver seat of the vehicle; and a spatial sensing means detecting positional information of instruction made by a driver in a spatial region between the driver seat and the displayed image display region, and the information display apparatus includes a means displaying the instruction made by the driver onto the image display region on the forward part in response to the positional information of the instruction made by the driver, detected by the spatial sensing means.

7 Claims, 13 Drawing Sheets

(51) Int. Cl.

| | |
|---|---|
| *B60K 35/235* | (2024.01) |
| *B60K 35/28* | (2024.01) |
| *B60K 35/65* | (2024.01) |
| *B60K 37/20* | (2024.01) |

(52) U.S. Cl.
CPC .............. *B60K 37/20* (2024.01); *B60K 35/28* (2024.01); *B60K 35/654* (2024.01); *B60K 2360/176* (2024.01); *B60K 2360/31* (2024.01); *B60K 2360/66* (2024.01); *G02B 2027/0181* (2013.01)

(56) References Cited

U.S. PATENT DOCUMENTS

| | | | |
|---|---|---|---|
| 2005/0012682 A1* | 1/2005 | Jenson ............... | G02B 27/0101 345/7 |
| 2005/0253055 A1* | 11/2005 | Sprague ............. | G02B 26/0858 250/234 |
| 2007/0103747 A1 | 5/2007 | Powell | |
| 2007/0188022 A1 | 8/2007 | Itabashi et al. | |
| 2011/0095910 A1* | 4/2011 | Takano ............. | B62D 15/0275 340/932.2 |
| 2014/0081521 A1 | 3/2014 | Frojdh | |
| 2014/0160074 A1 | 6/2014 | Ryoo et al. | |
| 2015/0293585 A1 | 10/2015 | Seok | |
| 2015/0363639 A1* | 12/2015 | Stanek ................. | G06V 10/143 382/103 |
| 2016/0132126 A1 | 5/2016 | Van Laack et al. | |
| 2016/0195719 A1 | 7/2016 | Yonetani | |
| 2016/0202482 A1 | 7/2016 | Kuzuhara | |
| 2016/0223814 A1* | 8/2016 | Lin .................... | G02B 27/0101 |
| 2016/0320900 A1 | 11/2016 | Nabe | |
| 2016/0349850 A1 | 12/2016 | Tsuda | |
| 2017/0050564 A1 | 2/2017 | Lv | |
| 2017/0102550 A1* | 4/2017 | Ponomarev ........... | B60K 35/81 |
| 2017/0291493 A1 | 10/2017 | Bostick | |
| 2017/0308173 A1* | 10/2017 | Youn ........................ | G01V 8/20 |
| 2019/0213976 A1 | 7/2019 | Rakshit | |

FOREIGN PATENT DOCUMENTS

| | | | |
|---|---|---|---|
| JP | 2012-56359 | A | 3/2012 |
| JP | 2012-73658 | A | 4/2012 |
| JP | 2013-97605 | A | 5/2013 |
| JP | 2013-250833 | A | 12/2013 |
| JP | 2015-132905 | A | 7/2015 |
| JP | 2015-134521 | A | 7/2015 |
| JP | 2015-194707 | A | 11/2015 |
| JP | 2016-14954 | A | 1/2016 |
| JP | 2016-88513 | A | 5/2016 |
| JP | 2016-149094 | A | 8/2016 |
| JP | 2017-139012 | A | 8/2017 |
| WO | 2005/023598 | A1 | 3/2005 |
| WO | 2014/096896 | A1 | 6/2014 |
| WO | 2015/159522 | A1 | 10/2015 |

OTHER PUBLICATIONS

Japanese Office Action received in corresponding Japanese Application No. 2021-175416 dated Dec. 6, 2022.

* cited by examiner

| | COLOR MIXTURE RATIO | | | BRIGHTNESS RATIO | CHROMATICITY | |
|---|---|---|---|---|---|---|
| | B(460) | G(532) | R(635) | | x | y |
| SINGLE COLOR BASED ON LASER | 1 | 0 | 0 | 172 | 0.144 | 0.03 |
| | 0 | 1 | 0 | 2536 | 0.17 | 0.796 |
| | 0 | 0 | 1 | 623 | 0.714 | 0.286 |
| SINGLE COLOR BASED ON NTSC | 1 | 0 | 0 | — | 0.14 | 0.08 |
| | 0 | 1 | 0 | — | 0.21 | 0.71 |
| | 0 | 0 | 1 | — | 0.67 | 0.33 |
| EQUIVALENT COLOR BASED ON NTSC | 1 | 0.05 | 0 | 299 | 0.145 | 0.05 |
| | 0.05 | 1 | 0.1 | 2607 | 0.2 | 0.766 |
| | 0 | 0.05 | 1 | 750 | 0.677 | 0.321 |
| BRIGHTNESS-EMPHASIZED COLOR | 1 | 0.1 | 0.05 | 457 | 0.155 | 0.074 |
| | 0.025 | 1 | 0.2 | 2665 | 0.232 | 0.708 |
| | 0 | 0.1 | 1 | 877 | 0.644 | 0.351 |

FIG. 23

| | COLOR MIXTURE RATIO | | | | | | BRIGHTNESS RATIO | CHROMATICITY | |
| | B1 (460) | B2 (450) | G1 (532) | G2 (515) | R1 (635) | R2 (645) | | x | y |
|---|---|---|---|---|---|---|---|---|---|
| SINGLE COLOR BASED ON LASER | 1 | 1 | 0 | 0 | 0 | 0 | 282 | 0.15 | 0.024 |
| | 0 | 0 | 1 | 1 | 0 | 0 | 4280 | 0.118 | 0.802 |
| | 0 | 0 | 0 | 0 | 1 | 1 | 1126 | 0.716 | 0.284 |
| SINGLE COLOR BASED ON NTSC | 1 | | 0 | | 0 | | — | 0.14 | 0.08 |
| | 0 | | 1 | | 0 | | — | 0.21 | 0.71 |
| | 0 | | 0 | | 1 | | — | 0.67 | 0.33 |
| EQUIVALENT COLOR BASED ON NTSC | 1 | 1 | 0.05 | 0.1 | 0 | 0 | 578 | 0.149 | 0.049 |
| | 0 | 0 | 1 | 1 | 0.1 | 0.5 | 4541 | 0.208 | 0.723 |
| | 0 | 0 | 0.05 | 0.1 | 1 | 1 | 1322 | 0.658 | 0.331 |
| BRIGHTNESS-EMPHASIZED COLOR | 1 | 1 | 0.05 | 0.1 | 0.05 | 0 | 704 | 0.153 | 0.056 |
| | 0 | 0 | 1 | 1 | 0.5 | 0.1 | 4632 | 0.23 | 0.704 |
| | 0 | 0 | 0.15 | 0.05 | 1 | 1 | 1489 | 0.637 | 0.354 |

INFORMATION DISPLAY APPARATUS AND SPATIAL SENSING APPARATUS

TECHNICAL FIELD

The present invention relates to an information display apparatus that projects information containing images onto a windshield glass of so-called vehicle such as a car, a train and an airplane moving while people are loaded therein, and, more particularly, relates to an information display apparatus having an interactive function used by a driver or others and relates to a spatial sensing apparatus for achieving the information display apparatus.

BACKGROUND ART

So-called Head-Up-Display (HUD) apparatus has been already known in, for example, the following Patent Document 1, the head-up-display apparatus creating virtual images by projecting image light onto a windshield glass of a car to display traffic information such as route information and traffic congestion information and car information such as a fuel level and a coolant temperature.

RELATED ART DOCUMENT

Patent Document

Patent Document 1: Japanese Patent Application Laid-Open Publication No. 2015-194707

SUMMARY OF THE INVENTION

Problems to be Solved by the Invention

For such a type of information display apparatus, downsizing is necessary in order to arrange the HUD apparatus main body between a steering in front of a driver seat and a windshield glass, and besides, so-called interactive function that enables operation in such a mode as creating interaction while making a user view a projected screen is necessary.

In the above-described head-up-display apparatus according to the related art, although a technique for the downsizing has been disclosed, the interactive function has not been described. Particularly, a technique has not been totally disclosed, the technique being an issue on the HUD apparatus and enabling the interactive operation for a screen projected on a space between the steering in front of the driver seat and the windshield glass.

A purpose of the present invention in an information display apparatus that projects information containing images onto a windshield glass of a vehicle is to provide an information display apparatus enabling an interactive function used by a driver and provide a spatial sensing apparatus for achieving the information display apparatus.

Means for Solving the Problems

The present invention has been made in order to achieve the above-described purpose. As one example to be cited, the present invention relates to an information display apparatus that displays information onto a vehicle, the information display apparatus includes an information display apparatus that displays image information onto an image display region on a forward part of a driver seat of the vehicle and a spatial sensing means that detects positional information of instruction made by the driver in a spatial region between the driver seat and the displayed image display region, and the information display apparatus includes a means that displays the instruction made by the driver onto the image display region on the forward part in response to the positional information of the instruction made by the driver, detected by the spatial sensing means.

In the present invention, note that the information display apparatus may include a virtual-image optical system that displays a virtual image onto the forward part of the vehicle by causing the windshield glass of the vehicle to reflect light emitted from this apparatus, the information display apparatus may include a practical-image optical system that displays a practical image by scanning the windshield glass of the vehicle with the light emitted from this apparatus, or the information display apparatus may include a direct-view type image display apparatus using an instrument panel of the vehicle.

Further, the present invention relates to a spatial sensing apparatus for achieving the above-described information display apparatus, and a provides a spatial sensing apparatus of the information display apparatus that is configured so that a plurality of a pair of a light emitting element and an optical element are linearly arranged, the light emitting element creating a collimated light flux from a light flux emitted from a light source and the optical element being made of a light-collecting lens element that receives a reflected light flux on obstacles among the light flux from this light emitting element.

Effects of the Invention

In an information display apparatus that projects information containing images onto a windshield glass of a vehicle, the present invention can provide an information display apparatus enabling selection/change of car control and a lot of display images such as a car control content and navigation information, etc., and enabling an interactive function operated by a driver, and provide a spatial sensing apparatus for achieving the information display apparatus.

BRIEF DESCRIPTIONS OF THE DRAWINGS

FIG. 23 is a chromaticity table of the light of the light source of the light scanning apparatus in the second scanning state in a working example.

BEST MODE FOR CARRYING OUT THE INVENTION

Hereinafter, working examples of the present invention will be described in detail with reference to drawings and others.

Figure 1A:
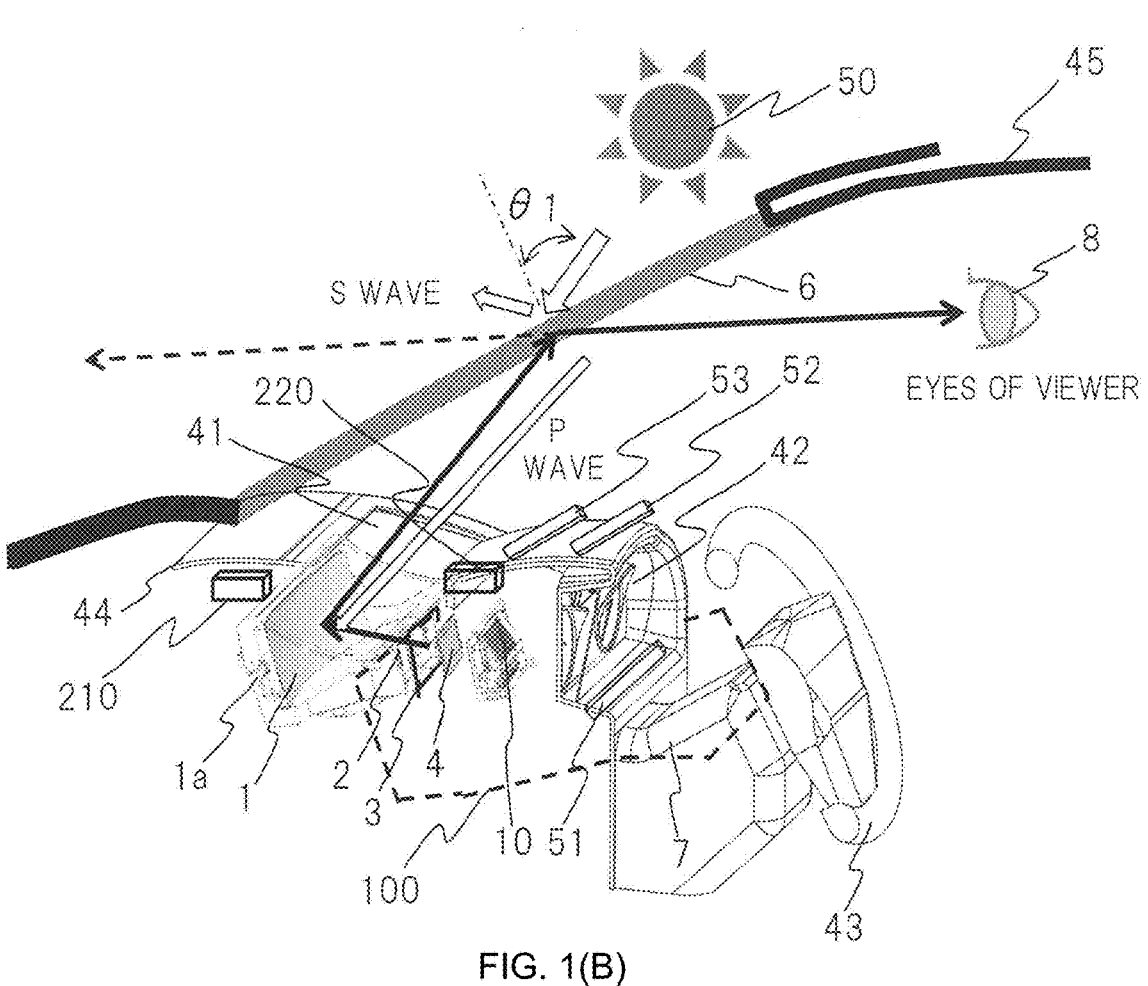
FIG. 1(A) is a schematic configuration diagram of an information display apparatus having an interactive function according to a working example of the present invention.
Figure 1B:
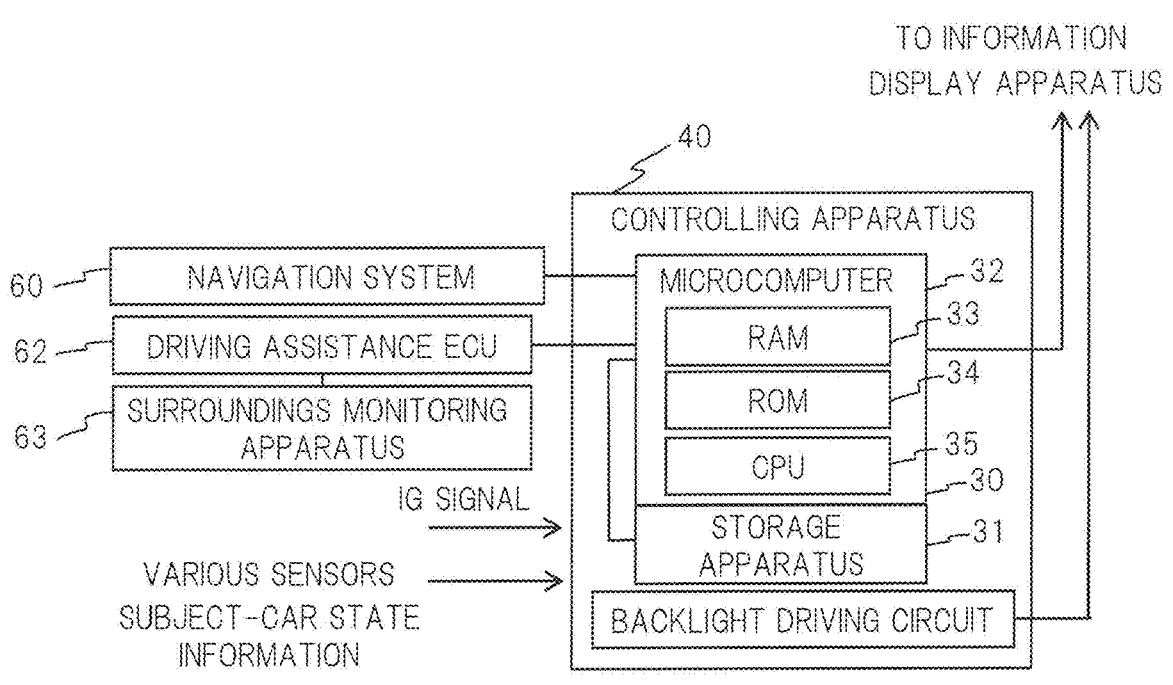
FIG. 1(B) is a schematic configuration diagram of peripheral apparatuses of the information display apparatus shown in FIG. 1(A)

First, FIG. 1(A) is a schematic configuration diagram of an information display apparatus having an interactive function according to a working example of the present invention and FIG. 1(B) is a schematic configuration diagram of peripheral apparatuses of the information display apparatus shown in FIG. 1(A).

Here, as one example, an information display apparatus that projects images onto a windshield glass of a car will be particularly explained. FIG. 1(A) is a cross-sectional perspective view of the information display apparatus, and FIG. 1(B) is a schematic configurational block diagram of the peripheral apparatuses.

FIG. 1(A) is a conceptual diagram of a cross-sectional surface of a vehicle body in which a numerical symbol 45 indicates a vehicle body while a numerical symbol 6 is a windshield glass that is a projection-receiving member. A HUD apparatus 100 is an apparatus that displays various types of information reflected as a virtual image by the projection-receiving member 6 (that is an inner surface of the windshield glass in the present working example) in order to form the virtual image on a forward part of a subject vehicle on a line of sight 8 of a driver. Note that the projection-receiving member 6 may be any member as long as being a member on which the information is projected, and may be not the above-described windshield glass but a combiner. That is, The HUD apparatus 100 of the working example may be any apparatus as long as forming the virtual image on the forward part of the subject vehicle on the line of sight 8 of the driver and allowing the driver to visually recognize the virtual image, and the information displayed as the virtual image includes, for example, vehicle information and information of front scenery, an image of which is captured by a camera (not illustrated) such as a monitoring camera, an around viewer camera and others.

The HUD apparatus 100 is provided with the image display apparatus 4 that projects the image light for use in displaying the information and lenses 2 and 3 that are the correcting optical elements for use in correcting distortion and aberration caused when the virtual image is formed by the concave mirror 1 using the image displayed on this image display apparatus 4, the lenses being provided between the image display apparatus 4 and the concave mirror 1.

The HUD apparatus 100 includes a controlling apparatus 40 that controls the image display apparatus 4 and a backlight source 10. Note that optical components including the image display apparatus 4, the backlight source 10 and others configure a virtual-image optical system described below, and include a concave mirror 1 having a concave shape that reflects the light. The light that has been reflected on this concave mirror 1 is reflected on the windshield glass 6 and goes to the line of sight 8 (that may be so-called Eyebox that is a driver's correctly-viewable point-of-view range) of the driver.

As the above-described image display apparatus 4, for example, note that not only an LCD (Liquid Crystal Display) having a backlight but also a self-luminescent VFD (Vacuum Fluorescent Display) and others are cited.

Meanwhile, the image may be displayed on a screen by a projection apparatus in place of the above-described image display apparatus 4, be created as the virtual image by the above-described concave mirror 1, be reflected by the windshield glass 6 that is the projection-receiving member, and be headed to the point of view 8 of the driver 8. Such a screen may be made of, for example, a micro lens array obtained by two-dimensionally arranging micro lenses.

More specifically, in order to reduce the distortion of the virtual image, a shape of the concave mirror 1 may have a relatively small curvature radius so as to increase a magnification power in an upper portion (a region that reflects the light rays on a lower portion of the windshield glass 6 having a relatively short distance to the point of view of the driver) shown in FIG. 1(A) but have a relatively large curvature radius so as to decrease the magnification power in a lower portion (a region that reflects the light rays on an upper portion of the windshield glass 6 having a relatively long distance to the point of view of the driver). Alternatively, more favorable correction is also achieved by tilting the image display apparatus 4 from the optical axis of the concave mirror to correct the difference in the virtual-image magnification, which results in the reduction in the distortion itself.

Next, in FIG. 1(B), from the navigation system 60, the controlling apparatus 40 acquires various types of information such as a speed limit and the number of lanes of a road corresponding to a current position at which the subject vehicle is running, a travelling-scheduled route of the subject vehicle set in a navigation system 60 or others as foreground-scenery information (that is information displayed as the virtual image on the forward part of the subject vehicle).

A driving assistance ECU 62 is a controlling apparatus that achieves driving assistance control by controlling a driving system and a control system in accordance with obstacles detected as a result of monitoring performed by a surrounding monitoring apparatus 63. The driving assistance control includes publicly-known techniques such as a cruise control system, an adaptive cruise control system, a pre-crash safety system and a lane keeping assist system.

The surrounding monitoring apparatus 63 is an apparatus that monitors a surrounding state of the subject vehicle, and is, as one example, a camera that detects an object existing in surroundings of the subject vehicle on the basis of an image acquired by capturing an image of the surroundings of the subject vehicle, an exploration apparatus that detects an object existing in surroundings of the subject vehicle on the basis of a result of transmission/reception of exploration waves, and others.

As the foreground-scenery information, the controlling apparatus 40 acquires the information (such as a distance to a vehicle running ahead, a direction of the vehicle running ahead, positions of obstacles and traffic signs and others) from such a driving assistance ECU 62. Further, to the controlling apparatus 40, an ignition (IG) signal and subject-vehicle state information are input. The "subject-vehicle state information" of such information is information acquired as the vehicle information, and includes alert information showing, for example, occurrence of a predetermined abnormal state of a fuel level of an internal combustion engine, a coolant temperature or others. And, the information also includes an operational result of a turn signal and a running speed of the subject vehicle, and besides, shift-lever position information and others.

An image signal from the controlling apparatus 40 described above is the image information corresponding to the state and the ambient surroundings of the car, and is selectively suitably displayed by the HUD apparatus 100 that is the first information display apparatus for use in overlapping the virtual image with the background practical view viewed by the viewer, displayed by the projection optical apparatus 220 that is the second information display apparatus for use in overlapping the practical image with the foreground view, and displayed by the direct-view type instrument panel 42 that is the third information display apparatus, so that point-of-view motion performed during the driving by the driver who is the viewer is reduced. Note that this controlling apparatus 40 is activated by the input of the ignition signal. The configuration of the entire system of the information display apparatus according to the present working example has been described above.

Figure 2:
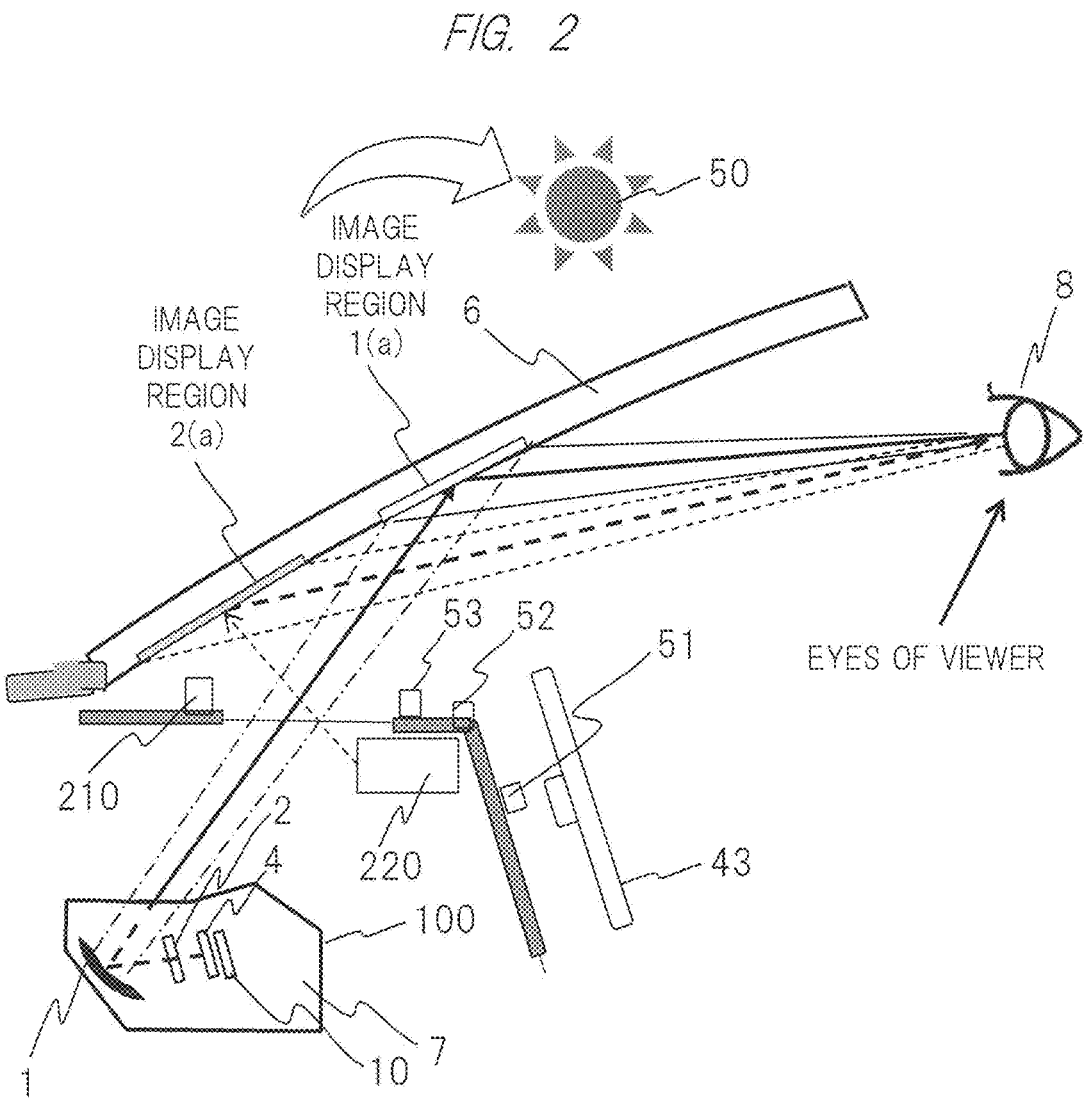
FIG. 2 is a schematic cross-sectional configuration diagram showing the information display apparatus, a windshield glass and a point-of-view position of a driver in a working example.
Figure 3:
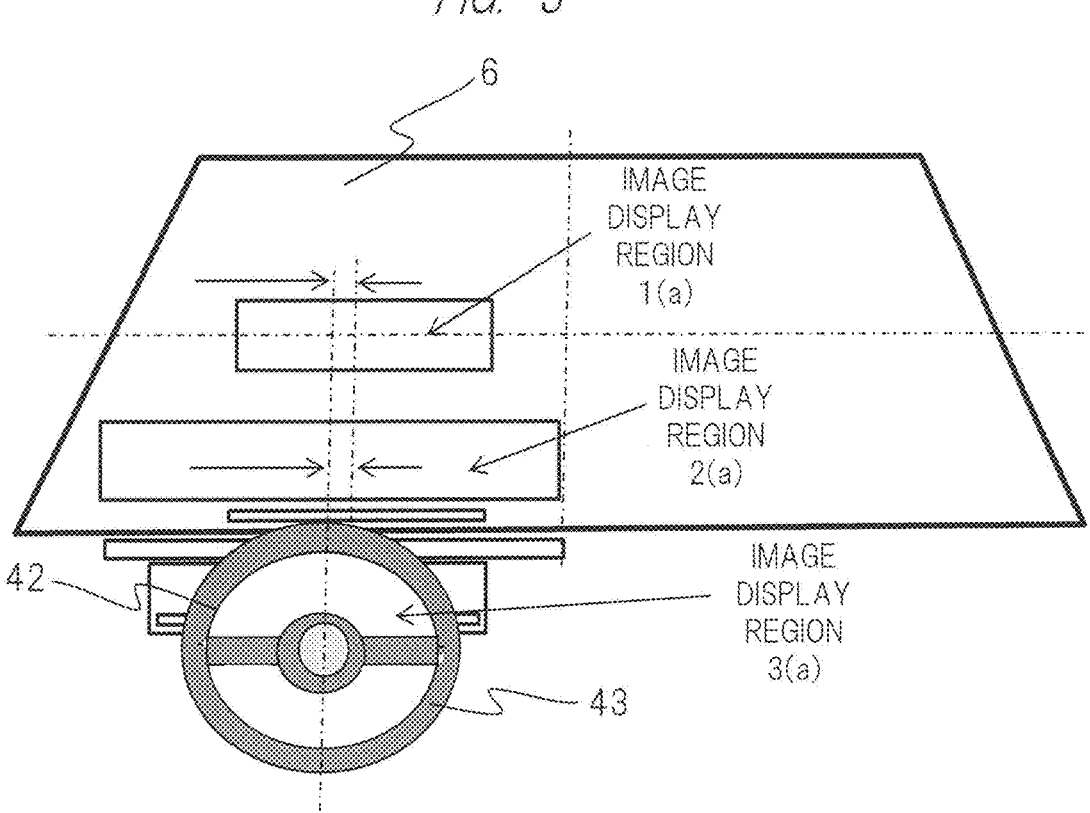
FIG. 3 is a schematic explanatory diagram of an image display position in a working example.

FIG. 2 is a schematic cross-sectional configuration diagram showing the information display apparatus, a windshield glass and a point-of-view position of a driver in the present working example. FIG. 3 is a schematic explanatory diagram of an image display position in the present working example, which is a schematic diagram in which the windshield glass 6 is viewed from the driver seat.

As shown in FIGS. 2 and 3, the present working example includes an image display region 1(*a*) near a center of the windshield glass 6 that is a forward surface of the steering 43, an image display region 2(*a*) on the lower portion of the windshield glass 6 and an image display region 3(*a*) over the instrument panel 42.

The information display apparatus in the present working example can suppress the point-of-view motion by causing the above-described HUD apparatus 100 to provide the viewer with a virtual image having a virtual-image distance of 8 m and a size that is equal to or larger than 40 inches while using, as a reflection surface, the image display region 1(*a*) (see FIGS. 2 and 3) near the center of the windshield glass 6 so that the virtual image is overlapped with the practical scenery that is being looked at by the driver during the driving. Note that the inventors have measured change of the point-of-view position of the driver during the driving in town, and have found that, through a practical measurement, the point-of-view motion is suppressed by 90% when the maximum value of the virtual-image distance is 30 m. Also, during a high-speed driving, it has been found that, through an experiment, the point-of-view motion can be similarly suppressed when the virtual-image distance is set to be equal to or larger than 70 m. In this case, a necessary virtual-image size is equivalent to 350 inches.

As described above, the HUD apparatus 100 displaying the virtual image is used to display this virtual image in the image display region 1(*a*) for a background region on which the point of view of the viewer is put. On the other hand, in order to overlap the image with the foreground view that is practically looked at by the driver who is the viewer in the image display region 2(*a*), the practical image is projected on the lower portion of the windshield glass by using the projection optical apparatus 220 that causes the MEMS (Micro Electro Mechanical Systems) elements to perform the scan with a light flux having a specific polarized wave. In this case, the image display using the MEMS is advantageous for the projection onto the windshield glass 6 having a curvature because this image display is basically performed in focus free.

Note that a member having a property of a reflectance against the specific polarized wave described in detail later, the reflectance being different from that against other polarized wave, is contained in the lower portion of the windshield glass on which the image is projected, or the member is applied, adhered or pasted on a glass surface inside the car, so that the image light is effectively reflected so as to orient the practical image to the viewer. In this case, a horizontal display dimension in the image display region 1(*a*) on the windshield glass 6 created by the HUD apparatus 100 is smaller than a horizontal display dimension of the practical image displayed by the projection optical apparatus 220 because the image light is focused to create the virtual image on a background part in front of the windshield glass.

Figure 4:
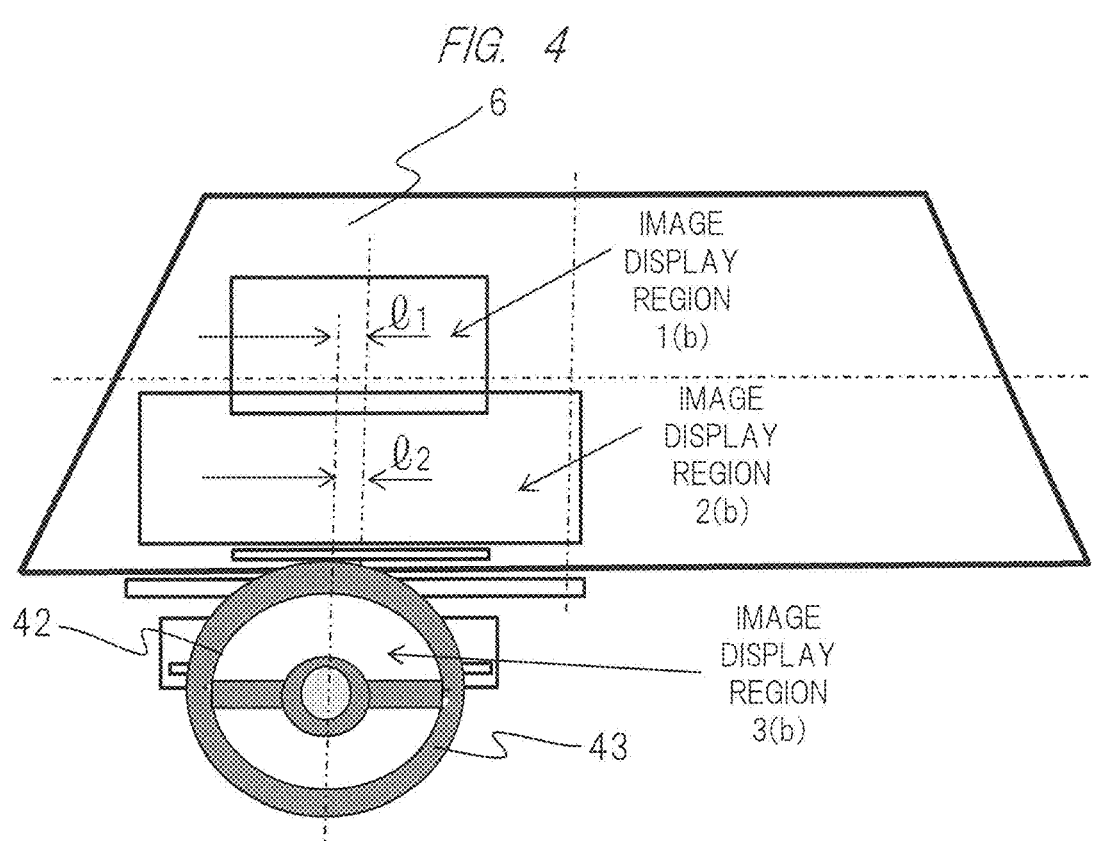
FIG. 4 is a schematic explanatory diagram of another image display position in a working example.

Further, through an experiment, it has been verified that virtual three-dimensional display is achieved by overlapping an image display region 2(*b*) where the image is overlapped with the foreground view with a part or entire of a background-image display region 1(*b*) where the virtual image is displayed by using the HUD apparatus as shown in FIG. 4 in place of the above-described division of the image display regions. When a display position of the virtual image in a deep direction is partially overlapped with a display position of the practical image in the deep direction in order to achieve more favorable display, a more favorable effect has been obtained. And, continuity of the displayed image has been obtained by the overlap display of the two image display regions, so that a new effect such as the smoothed point-of-view motion has been also obtained.

A display position, a display color and a display pitch of the virtual image projected on the above-described portion near the center of the windshield glass are suitably selected by a viewing camera 210 for use in viewing a state of the viewer, and not only an image display of information indicating a next operation of a car controlled in an autonomous driving state, such as turning right/left, stoppage or acceleration, but also an image display for attention seeking by using information acquired by sensing a health state of the driver, sleepiness of the same or others are performed. Note that it is unnecessary to always display such information, and it is desirable to follow a motion of a line of eyes of the driver by using the viewing camera 210 and display the information at a necessary part if needed.

<Interactive Function>

The inventors have found out that, for example, combination use of a spatial sensing apparatus with the above-described information display apparatus in order to reduce the point-of-view motion and acquire a lot of information achieves an image display apparatus selecting/changing a lot of display images such as the control, the control content and the navigation information of the car in small point-of-view motion by selecting a plurality of images or selecting a switch unit or others, an image of which is displayed. Particularly, the inventors have found out that achievement of so-called interactive function enabling an operation in a mode allowing a user to have interaction while viewing a projected screen is effective to achieve a more convenient and available information display apparatus. A configuration for use in achieving such an interactive function will be described below.

<Spatial Sensing Apparatus>

A numerical symbol 51 shown in FIG. 1(A) indicates a spatial sensing apparatus corresponding to the instrument panel 42 (the image display regions 3(a) and 3(b)) and is arranged close to a display surface, so that a plurality of images are selected, or a switch unit, an image of which is displayed, is selected to achieve selection for the lot of display images such as the control, the control content and the navigation information of the car in the small point-of-view motion Further, numerical symbols 52 and 53 indicate a spatial sensing apparatus that are arranged in parallel to the spatial sensing apparatus 51 so as to enable spatial sensing (corresponding to the image display regions 1(a) and 2(a) in FIG. 3 or the image display regions 1(b) and 2(b) in FIG. 4) also for the positional information in the deep direction from the steering 43 to the windshield glass 6.

Figure 5:
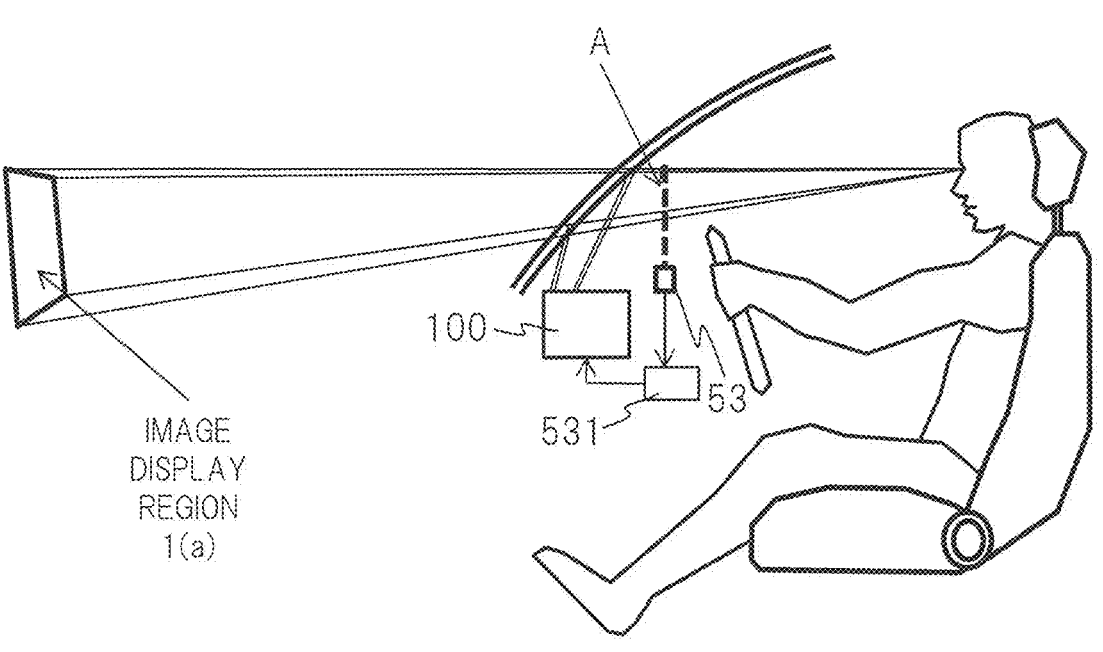
FIG. 5 is a schematic diagram for explaining a configuration for use in achieving an interactive function in a working example.
Figure 6:
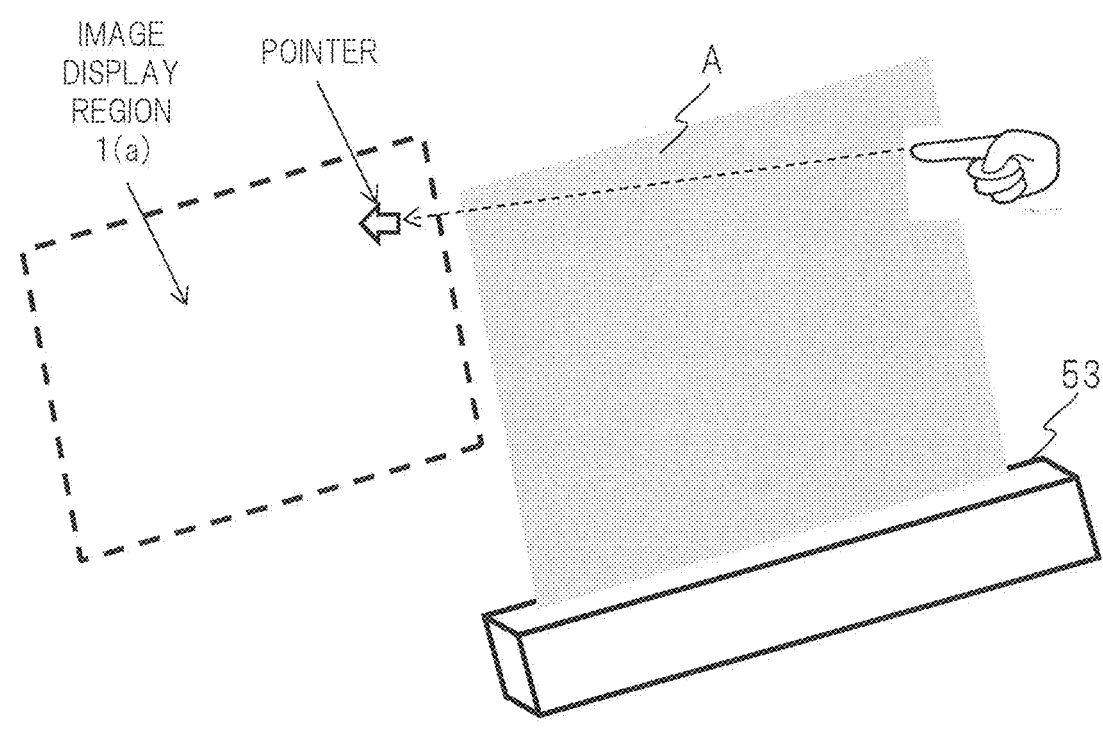
FIG. 6 is a schematic diagram for explaining an interactive function in a working example.

As one example of the spatial sensing apparatus, for example, the spatial sensing apparatus 53 corresponding to the image display region 1(a) or 1(b) in FIGS. 3 and 4 will be particularly described here. As shown in FIGS. 5 and 6, in this spatial sensing apparatus, by freely operating/moving the driver's finger (or a bar-shaped object held by the fingers: obstacle) on a spatial region (shown with a dashed line "A" in the drawings), the driver who is driving the car while viewing the information displayed on this image display region can freely operate/move an instruction means (pointer) on a screen displayed on this image display region even when taking the driver seat. Accordingly, a position of this instruction means (pointer) is calculated from, for example, a detected coordinate position of the finger (obstacle) through a conversion apparatus 531 or others, and is output as positional information of the pointer to the above-described HUD apparatus 100 (see FIG. 1(A) or 2).

In this manner, even during the driving, the driver can input the positional information corresponding to a desirable position of the screen information to make an instruction of a desirable order by moving the finger or others to the desirable position of the screen information in the spatial region shown with the dashed line A while viewing the screen information displayed on the forward part. That is, the so-called interactive function enabling the operation in the mode allowing the user to have interaction while viewing the projected screen is achieved.

Figure 7:
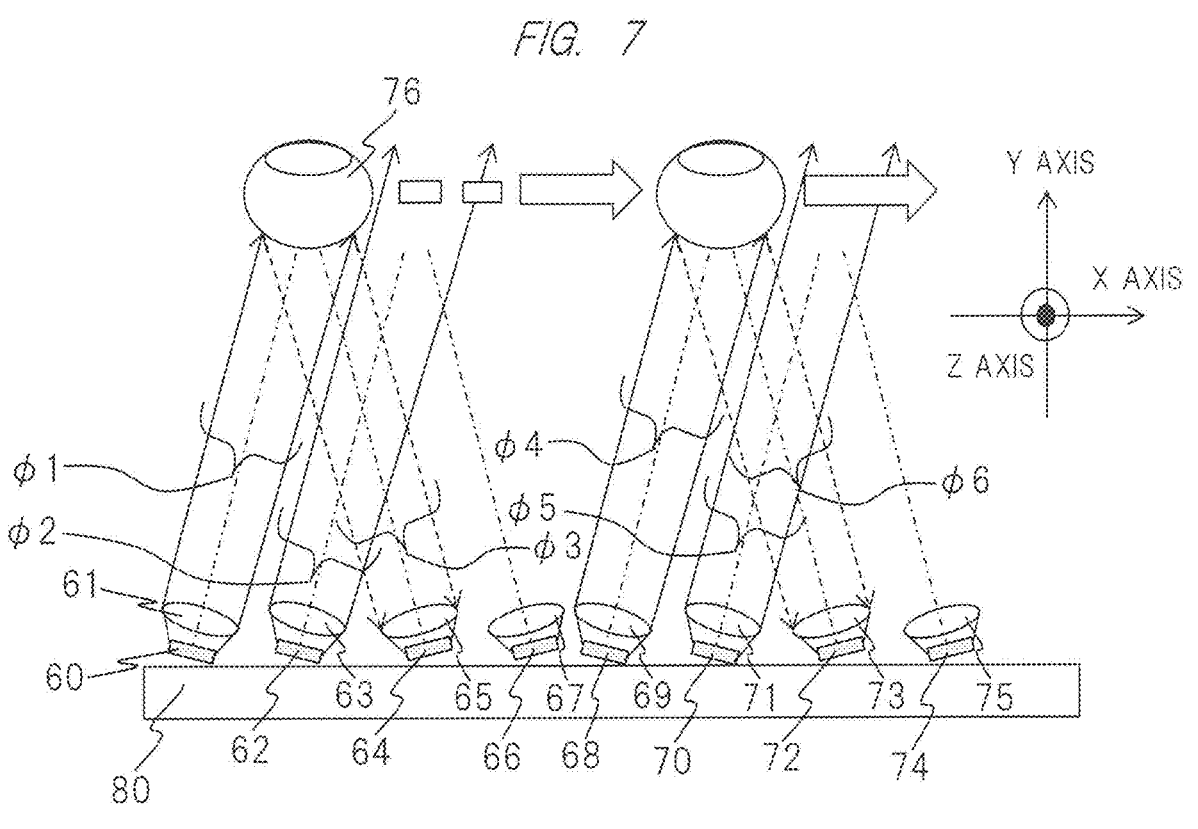
FIG. 7 is a first explanatory diagram for explaining a principle of a spatial sensing apparatus.

Subsequently, FIG. 7 shows a principle of a configuration and an operation of the spatial sensing apparatus of the invention of the present application. When the finger of the user (such as the driver) moves from a left side to a right side in the drawing, a light flux $\varphi 1$ from a first light source 60 is converted first to a substantially-collimated light flux by a capacitor optical element 61, is reflected by the moving finger of the user, is collected to become a reflective light flux $\varphi 3$ by a light-collection lens element 65, and reaches a first light receiving unit 64.

At this stage, information of a distance to the finger in a Y-axis direction is acquired from a temporal difference $\Delta t1$ between light-emission time of the first light source 60 and light-reception time of the first light receiving unit 64, and, at the same time, information of the position in an X-axis direction is acquired from absolute positional coordinates of the first light source 60 and the first light receiving unit 64. Then, as shown in this drawing, when the finger of the user (such as the driver) moves from the left side to the right side in the drawing, a light flux $\varphi 4$ from a third light source 68 is converted first to a substantially-collimated light flux by a capacitor optical element 69, is reflected by the moving finger of the user, is collected to become a reflective light flux $\varphi 6$ by a light-collection lens element 73, and reaches a third light receiving unit 72.

At this stage, information of a distance to the finger in the Y-axis direction is acquired from a temporal difference $\Delta t2$ between light-emission time of the third light source 68 and light-reception time of the third light receiving unit 72, and, at the same time, information of the distance in the X-axis direction is acquired from absolute positional coordinates of the third light source 68 and the third light receiving unit 72.

Figure 8:
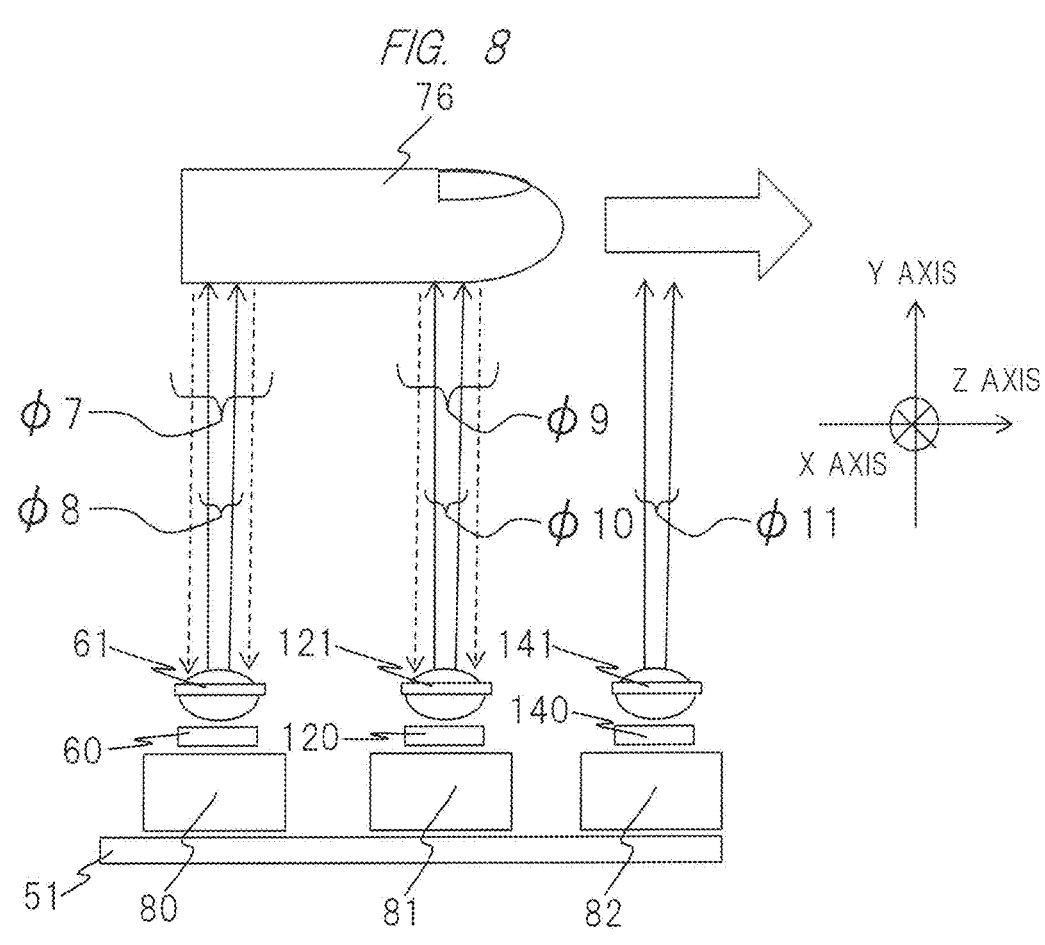
FIG. 8 is a second explanatory diagram for explaining the principle of the spatial sensing apparatus.

Next, a method of acquiring positional information in a Z-axis direction will be explained with reference to FIG. 8. A plurality of units 80 (shown as 80, 81 and 82 in the drawing) that perform sensing for the positional information in the X-axis direction and the Y-axis direction explained with reference to FIG. 7 are arranged in the Z-axis direction (a deep direction from the steering 43 toward the windshield glass 6). When the finger of the user (such as the driver) moves from the left side to the right side on the sensing apparatus 51 in the drawing, a light flux $\varphi 8$ from a specific light source 60 of the first unit 80 is converted first to a substantially-collimated light flux, is reflected by the moving finger of the user, is collected to become a reflective light flux $\varphi 7$ by a light-collection lens element (not illustrated), and reaches a light receiving unit (not illustrated). At this stage, by the above-described operation of the unit, time (absolute time T1) taken for passage through the first unit 80 and the X-Y coordinates are made clear. As similar to the second unit 81, when the finger of the user further moves from the left side to the right side, time (absolute time T2) taken for passage through the second unit 81 and the X-Y coordinates are made clear. Since a light flux $\varphi 11$ of the third unit 82 does not block the finger of the user as shown in FIG. 8, the finger position in the Z-axis direction can be also identified.

Further, a moving speed and an acceleration of the finger in the Z-axis direction of the spatial axis can be calculated from temporal difference between the absolute time T1 and the absolute time T2 and a sensing output (the X-Y coordinates and absolute time taken for acquiring the reflection light reflected from the finger by the light-reception unit) of the second unit 81. Similarly, a moving direction and an acceleration of the finger is also calculated from the sensing information of the first unit 80 and the second unit 81, so that not only the simple positional information but also a user's will (such as stronger will in a larger acceleration) can be reflected on an information display amount, speed and position of a system and others.

Note that the above-described configuration of the spatial sensing apparatus has been disclosed in, for example, Japanese Patent Application Laid-Open Publication (Translation of PCT Application) No. 2012-518228 and others. Also, in a market, a spatial sensing apparatus named as "AIRBAR (registered trademark: Neonode Inc.)" has been merchandised, and is known as the one that makes a PC have the touch panel function when being simply placed. This spatial sensing apparatus has a bar shape, and therefore, can be easily arranged at a desirable position even when being placed on an instrument panel or a dashboard inside a small car.

Note that the spatial sensing apparatus 53 corresponding to the image display region 1(*a*) in FIG. 3 or the image display region 1(*b*) in FIG. 4 has been described above in detail. However, the image display region 2(*a*) in FIG. 3 or the image display region 2(*b*) in FIG. 4 as well as the image display region 3(*a*) in FIG. 3 or the image display region 3(*b*) in FIG. 4 are described as similar to the above description. For those who are skilled in the art, it would be clear that this manner can achieve the so-called interactive function that is the input of the positional information corresponding to a desirable position of the screen information to make an instruction by the movement of the finger or others to the desirable position of the screen information in the spatial region shown with the dashed line A while the user views the screen information displayed on the forward part, in other words, that is the operation in the mode allowing the user to have the interaction while viewing the projected screen.

Other Feature of Present Working Example

Figure 9:
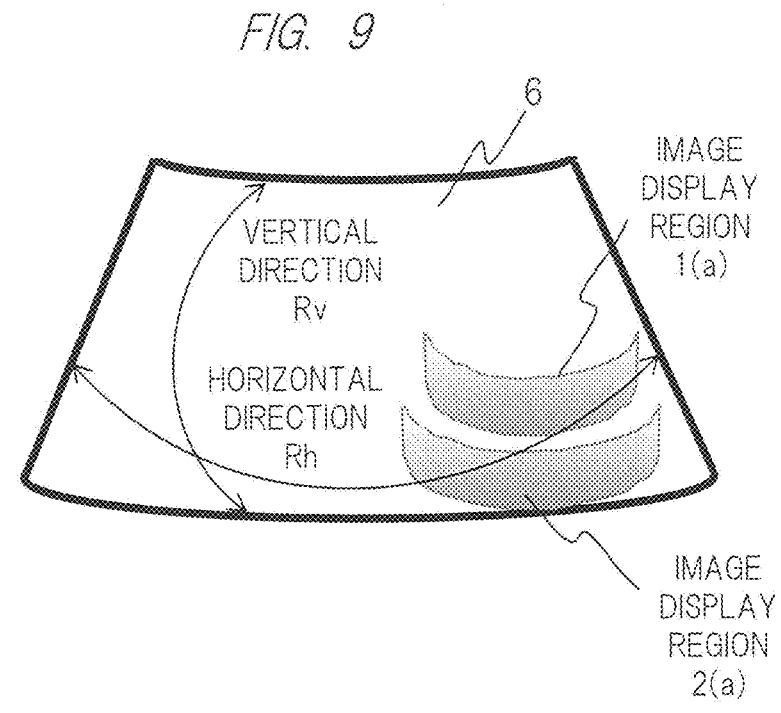
FIG. 9 is a diagram for explaining difference in a curvature radius of a windshield glass in a working example.

As shown in FIG. 9, the windshield glass 6 of the car has a curvature radius "Rv" in a vertical direction and a curvature radius "Rh" in a horizontal direction that are different from each other, and a relation of "Rh>Rv" is generally established. Therefore, as shown in FIG. 9, when the windshield glass 6 is regarded as the reflection surface, the windshield glass 6 becomes a toroidal surface of the concave mirror. Therefore, in the HUD apparatus 100 of the present working example, the shape of the concave mirror 1 may have an average curvature radius that is different between the horizontal direction and the vertical direction so as to correct a virtual-image magnification depending on the shape of the windshield glass 6, that is, correct the difference in the curvature radius between the vertical direction and the horizontal direction of the windshield glass. In this case, the shape of the concave mirror 1 as a spherical or aspherical shape (expressed by an expression (2) below) that is symmetrical across the optical axis is expressed by a function of a distance "h" from the optical axis, and a horizontal cross-sectional shape and a vertical cross-sectional shape of each of distant regions cannot be individually controlled, and therefore, the shape is preferably corrected so as to follow a function of plane coordinates (x, y) from the optical axis of the mirror surface so as to be a free curved surface expressed by an expression (1) described below.

[Numerical Expression 1]

$$Z = \frac{c*(x^2 + y^2)}{1 + \sqrt{1 - (1+K)c^2 \cdot (x^2 + y^2)}} + \sum\sum (Cj(m,n) \times x^m \times y^n) \quad (1)$$

[Numerical Expression 2]

$$Z = \frac{c \cdot h^2}{1 + \sqrt{1 - (1+K)c^2 \cdot h^2}} + A \times h^4 + B \times h^6 + C \times h^8 + \\ D \times h^{10} + E \times h^{12} + F \times h^{14} + G \times h^{16} + H \times h^{18} + I \times h^{20} \quad (2)$$

In this case, a symbol "z" is a sag amount on the coordinates (x, y) with reference to axes defining a plane, a symbol "c" is a curvature on an origin of the axes defining the plane, a symbol "K" is a conic constant, and a symbol "Cj" is a coefficient.

Return to FIG. 1(A) again. For example, the lens element 2 and the lens element 3 are further arranged as transmissive optical components between the image display apparatus 4 and the concave mirror 1 to control an emission direction of the optical ray to the concave mirror, so that distortion is corrected in accordance with the shape of the concave mirror 1, and besides, virtual-image aberration including astigmatism caused by the above-described difference between the curvature radius in the horizontal direction and the curvature radius in the vertical direction of the windshield glass 6 is corrected.

Figure 10:
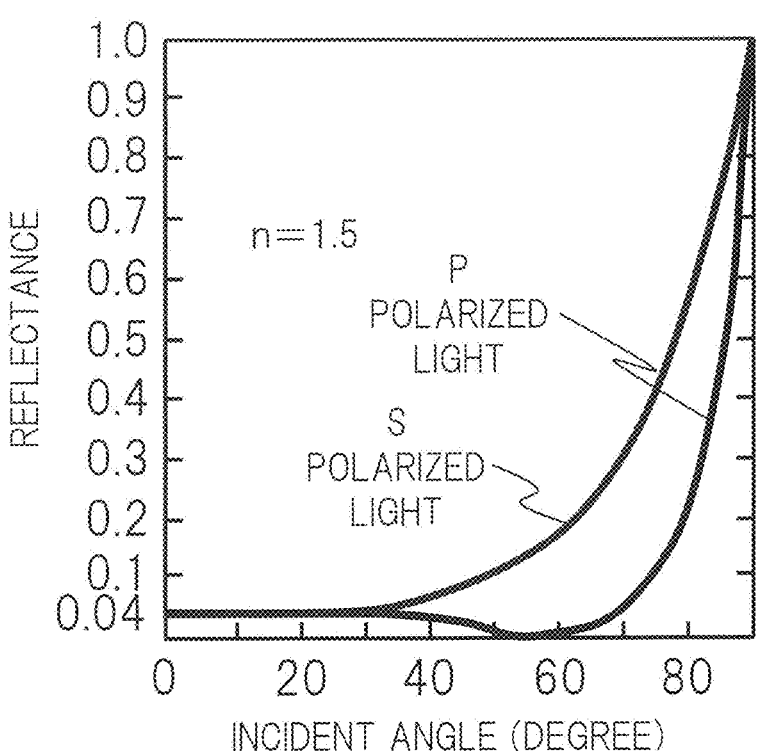
FIG. 10 is a characteristic diagram showing a reflectance with respect to an incident angle of different polarized light on a glass in a working example.

Meanwhile, as shown in FIGS. 1 and 2, most of S-polarized waves of the light flux from the sun 50 are reflected on the windshield glass 6 while most of components of the light flux entering the car are P-polarized waves. Therefore, in order to project the image on the lower portion of the windshield glass for overlapping the image with the foreground view, the projection optical apparatus 220 that allows the S-polarized light flux to enter the MEMS element for the scan is used. In this case, another reason why the S-polarized waves are used for the image display is that the S-polarized waves each has a high reflectance on the windshield glass as shown in FIG. 10 since a tilt angle of the windshield glass 6 is equal to or larger than 40 degrees that is large.

Figure 11:
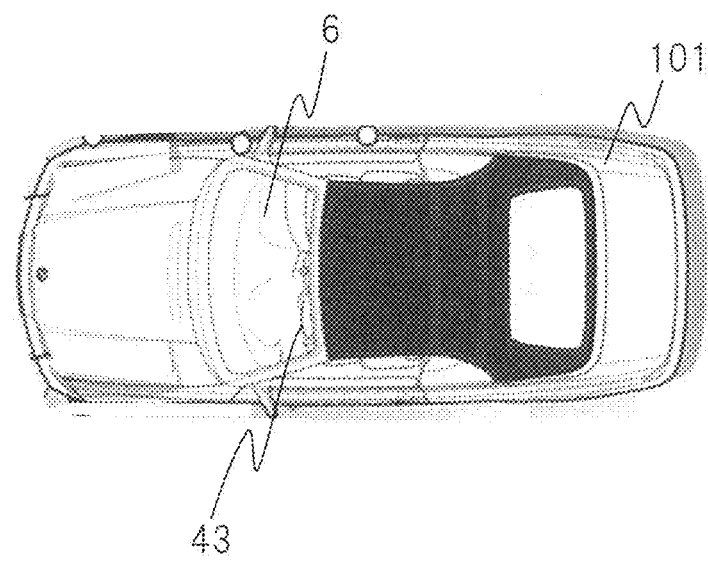
FIG. 11 is a top view of a car on which an information display apparatus is mounted in a working example.

Further, another reasons are that the windshield glass 6 of the car has the curvature radius Rh in the horizontal direction and the curvature radius Rv in the vertical direction that are different from each other as shown in FIG. 9 and that the center of the image is different from the position of the driver who is the viewer (a position of the steering 43 in FIG. 11) as shown in FIG. 11 across the center of the curvature in the horizontal direction.

Figure 12:
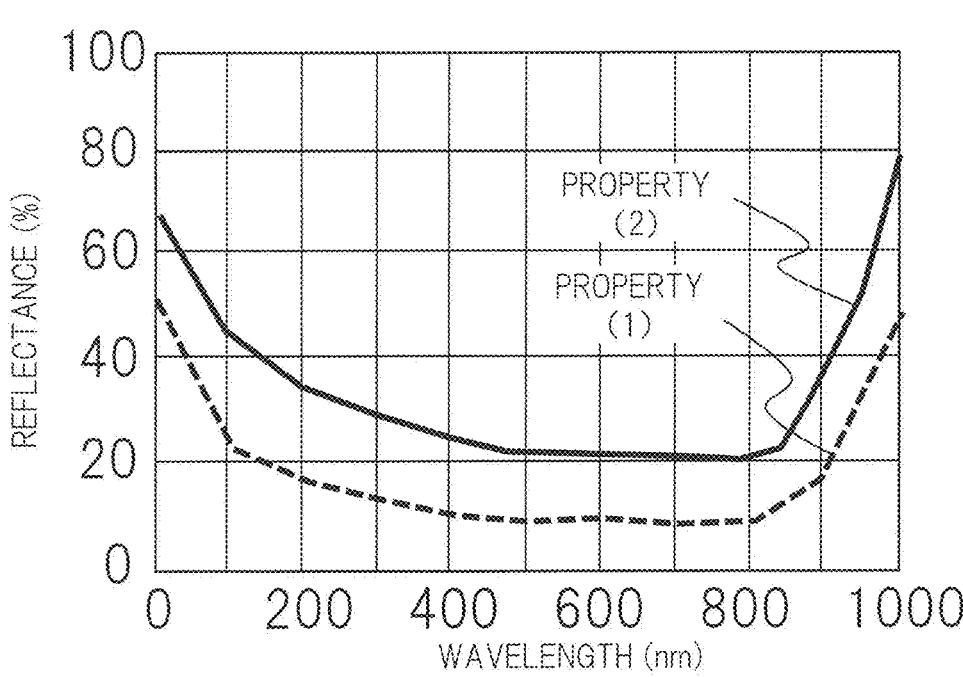
FIG. 12 is a characteristic diagram showing a reflectance of a reflective material applied, adhered or pasted on a windshield glass in a working example.

On the other hand, the above-described projection optical apparatus 220 projects the image onto the windshield glass by allowing the MEMS to perform the scanning in the vertical and horizontal directions while using a laser light source, and a member having a property that has a reflectance against the S-polarized waves different from a reflectance against the P-polarized waves is contained in the image display region 2(*a*) on the lower portion of the windshield glass shown in FIGS. 2 and 3, or the member is applied, adhered or pasted on the glass surface inside the car, so that the image light is effectively reflected to orient the practical image to the viewer. More specifically, as a reflectance against the S-polarized laser light in a visible-light range (380 nm to 780 nm), a reflectance from about 10% to about 20% shown as a property (1) to about 20% shown as a property (2) on average is favorable as shown in FIG. 12, so that the image light is reflected on the reflection surface of the windshield glass in contact with a room inside, and heads toward the driver who is the viewer.

More specifically, the same effect may be provided by using a sheet obtained by laminating optical multi-layer films having the above-described properties or laminating a plurality of sheets having different refractive indexes from one another, or surface asperity may be formed on a sheet surface in order to cause a larger diffusion property in the horizontal direction of the windshield glass than a diffusion property in the vertical direction of the same.

Setting the above-described sheet reflectance to be high in an ultraviolet region (shorter than 380 nm) and a near-infrared region (longer than 780 nm) leads to suppression of entrance of ultraviolet rays and near-infrared rays into the car for achieving more comfortable circumstances.

As described above, in addition to the above-described features, the present working example relates to an information display apparatus that displays information onto a vehicle, and the information display apparatus is configured so that the information display apparatus includes the first information display apparatus that causes light reflected on the windshield glass of the vehicle to display image information of the virtual image, the second information display apparatus that allows the MEMS element to scan the windshield glass with the laser light to acquire the practical image, and the third information display apparatus that uses the instrument panel of the vehicle, so that the first information display apparatus includes the virtual-image optical system that displays the virtual image onto the forward part of the vehicle by causing the windshield glass to reflect the light emitted from the image display apparatus displaying the image information, so that the second information display apparatus includes the practical-image optical system that displays the practical image onto the windshield glass by causing the scanning-type mirror element to perform the scanning with the laser light, so that the third information display apparatus includes the direct-type image display apparatus as the instrument panel, and so that the image display position of the first information display apparatus is set to the portion near the center of the windshield glass while the image display position of the second information display apparatus is set to the lower portion of the windshield glass.

In this manner, the information display apparatus that reduces the point-of-view motion of the driver to contribute to the safety driving assistance can be provided by the display combination among the HUD apparatus that overlaps the virtual image with the background view, the practical-image display apparatus that displays the practical image overlapped with the foreground view, and the instrument panel.

Further, more specific optical configuration of the HUD apparatus including the virtual-image optical system of the information display apparatus will be described below.

Figure 13:
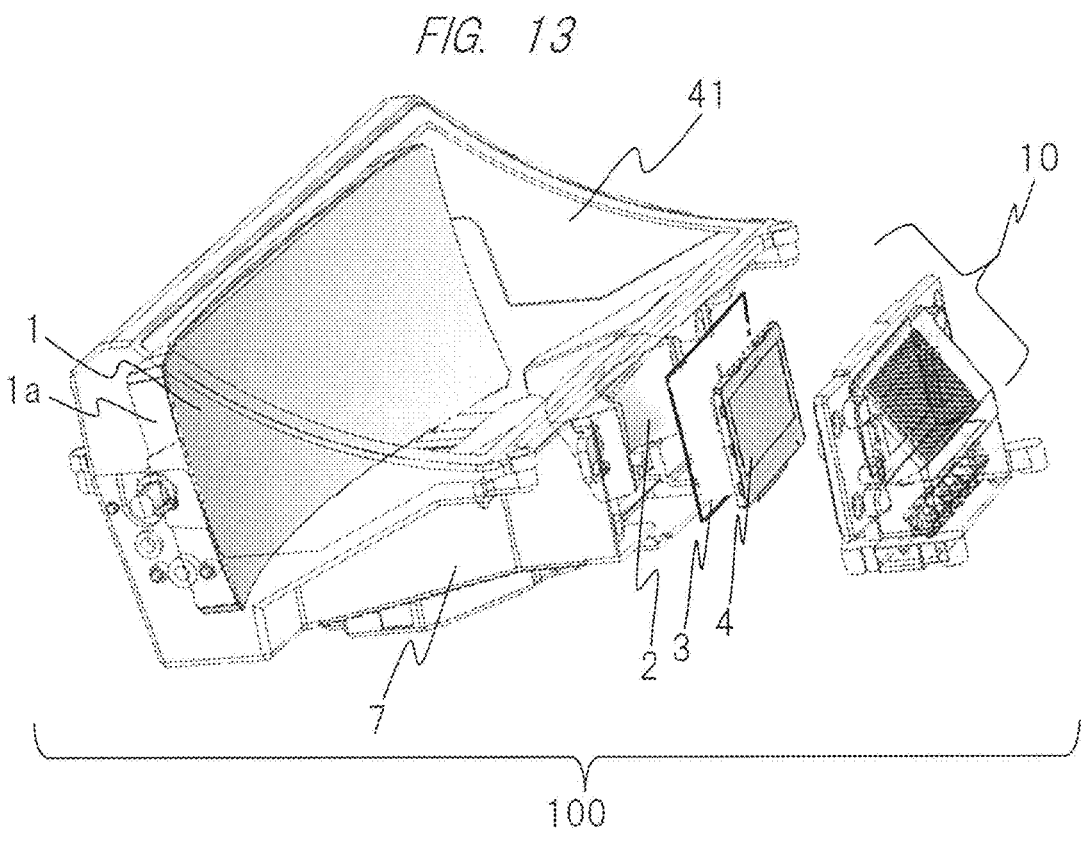
FIG. 13 is a schematic configuration diagram of a virtual-image optical system of an information display apparatus in a working example.

FIG. 13 is an entire configuration diagram of the HUD apparatus 100 in the present working example. In FIG. 13, the concave (free-curved) mirror 1 that projects the image light for use in forming the virtual image through the windshield glass 6, the correction lens group 2 for use in correcting the distortion and the aberration caused in the projection, the image display apparatus 4, and the backlight source 10 configuring the backlight are provided in an order from a downstream side. Note that a numerical symbol "7" indicates a housing. Further, in order to suppress the P-wave components of the sunlight entering the HUD apparatus 100, an optical means 3 for use in suppressing the P-wave components are provided as one example between the lens group 2 and the image display apparatus 4.

First, in the present working example, the concave (free-curved) mirror 1 that projects the image light preferably has a function of reflecting the visible light (wavelength: about 400 to 700 nm), and besides, removing, for example, particularly the infrared rays (IR), the ultraviolet rays (UV) and others, that are unnecessary for the information display apparatus and damage on the apparatus, from the sunlight containing various wavelength spectra. In this case, when the reflectance of the visible light is set to be equal to or higher than 95%, a virtual-image optical system having a high light use efficiency is achieved.

However, on the other hand, a case of direct looking at the concave (free-curved) mirror 1 through the windshield glass reduces dignity of the car since external light is reflected to cause bright view, reduces an image quality such as a contrast performance of the image (virtual image) acquired in the information display apparatus since intensive light such as the sunlight or a headlight of an oncoming car at night is reflected on the concave mirror 1 so that a part of the light rays returns to a liquid crystal panel, and damages a polarization plate and the liquid crystal panel configuring the image display apparatus 4. Therefore, when the reflectance of the concave (free-curved) mirror 1 is purposely reduced to be equal to or lower than 90%, more preferably, equal to or lower than 85%, the above-described problems can be solved.

As a concave mirror supporting portion 1a that is a base member of the concave (free-curved) mirror 1, a high-transparent member is selected in order not to allow the base member to absorb the above-described light having the non-reflected wave-length component of the sunlight. As a plastic-made high-transparent member, (1) ZEONEX produced by Zeon corporation, (2) polycarbonate, (3) acrylic resin and others are cited. The (1) ZEONEX having a moisture absorption rate of almost 0% and a high thermal deformation temperature is suitable but expensive, and therefore, it is preferable to use a devised polycarbonate having the similar thermal deformation temperature and a moisture absorption rate of about 0.2%. The acrylic resin having the highest formability and being inexpensive has the highest moisture absorption rate, and therefore, it is essential to arrange a moisture proof film and a reflection film.

In order to prevent the moisture absorption of the base member of the concave (free-curved) mirror 1, in accordance with the reflection film formed on the reflection surface, the moisture proof film may be arranged on an opposite surface by depositing SiN (silicon nitride) thereon as the moisture proof film. Since the SiN film that is the moisture proof film transmits the sunlight, the light absorption on the base member does not occur, so that the thermal deformation can be suppressed. As a result, the shape change of the concave (free-curved) mirror made of the polycarbonate or the acrylic resin due to the moisture absorption can be also prevented.

Further, although not illustrated here, a light-transmitting plate having a function of removing the IR and the UV may be arranged on an opening 41 formed above the HUD apparatus 100 in addition to or in place of the concave (free-curved) mirror 1 having the function of suppressing/removing the IR and the UV. In this case, note that the prevention of external dusts from entering the HUD apparatus 100 can be achieved in addition to the provision of the IR- and UV-suppression function.

As described above, by the concave (free-curved) mirror 1, the unnecessary components of the sunlight having a lot of spectrum components entering the HUD apparatus 100 through the opening 41 can be removed in the HUD apparatus 100, and the visible-light component thereof can be mainly selectively extracted.

Meanwhile, as a factor reducing the image quality of the HUD apparatus, it is known that the image quality is reduced since the image light rays emitted from the image display apparatus 4 toward the concave mirror 1 is reflected on a surface of the optical element 2 arranged in the middle, and then, returns to the image display apparatus, is reflected again, and is overlapped with the original image light. Therefore, in the present working example, it is preferable not only to suppress the reflection by depositing a reflection preventing film on the surface of the optical element 2 but also to design a limited lens surface shape of either one or both of image-light incident surface and exit surface of the optical element 2 so that the above-described reflection light is avoided from extremely collecting on only one part of the image display apparatus 4.

Next, when a liquid crystal panel having a polarizing plate arranged in order to absorb the reflection light emitted from the optical element 2 is used as the image display apparatus 4, the reduction in the image quality can be suppressed. A backlight source 10 of the liquid crystal panel is controlled to orient an incident direction of the light entering the image display apparatus 4 so that the light efficiently enters an entrance pupil of the concave mirror 1. Further, a solid-state light source having a long product lifetime may be adopted as the light source, and besides, the polarized-light conversion is preferably performed by using a PBS (Polarizing Beam Splitter) in which an optical means for reducing a divergence angle of the light is provided as an LED (Light Emitting Diode) having small light output change against variation in an ambient temperature.

The polarizing plate is arranged at a position closer to the backlight source 10 (the light incident surface) and a position closer to the optical element 2 (the light exit surface) in the liquid crystal panel to increase a contrast ratio of the image light. When an iodine-based material having a high polarization degree is used for the polarizing plate at the position closer to the backlight source 10 (the light incident surface), a high contrast ratio can be obtained. On the other hand, when a dye-based polarizing plate is used at the position closer to the optical element 2 (the light exit surface), high reliability can be obtained even if the external light enters or even if the ambient temperature is high.

In the case of the usage of the liquid crystal panel as the image display apparatus 4, particularly when the driver wears polarized sunglasses, a specific polarized wave is blocked, and failure of an image to be visible occurs. In order to prevent this, it is preferable to arrange a λ/4 plate at a position closer to the optical element of the polarizing plate arranged at the position closer to the optical element 2 of the liquid crystal panel so as to convert the image light unified in a specific polarizing direction into circular polarized light.

Further, a more specific optical configuration of the projection optical apparatus having the practical-image optical system of the information display apparatus will be described.

Figure 14:
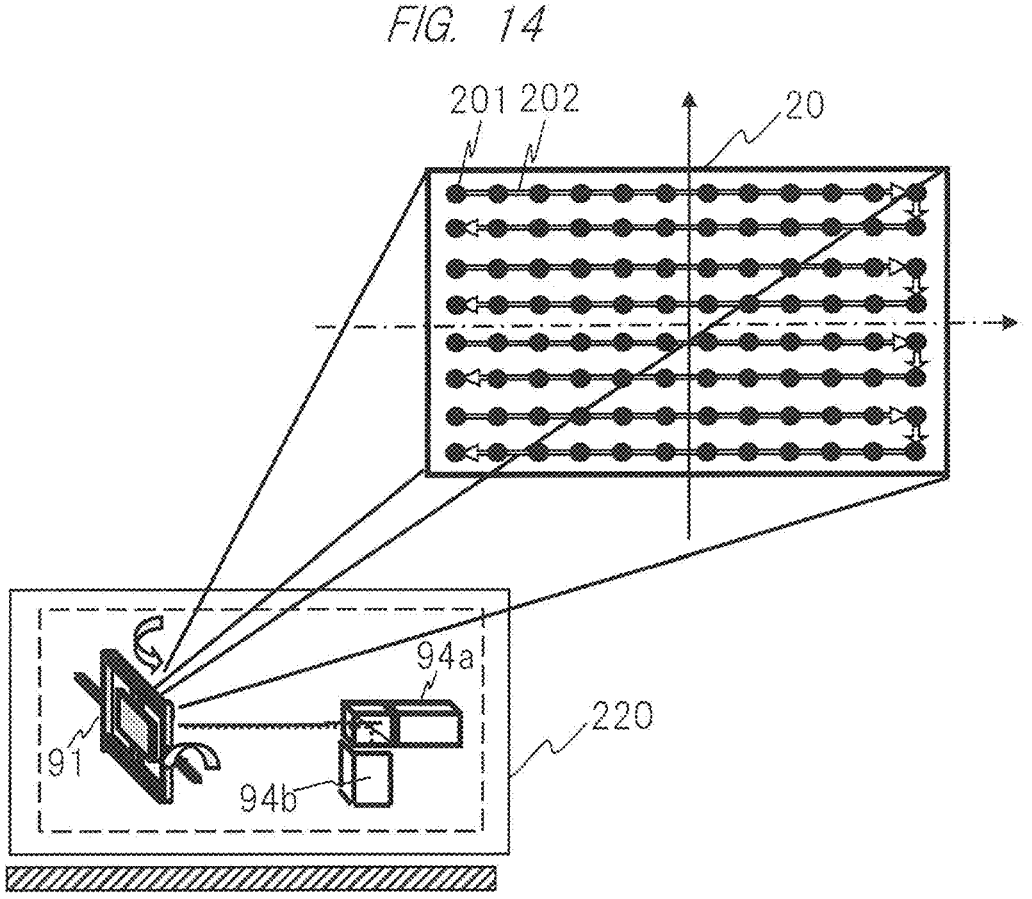
FIG. 14 is a basic configuration diagram of a projection optical apparatus in a working example.

FIG. 14 is a basic configuration diagram of a projection optical apparatus 220 that acquires the practical image by causing the MEMS to perform the scanning with the laser light in the present working example. In FIG. 14, the projection optical apparatus 220 is a scanning-type image display apparatus that mounts an optical scanning apparatus performing scanning in a two-dimensional direction with the laser light having been modulated in a light intensity (referred to as "modulated" below) in accordance with the image signal, and that causes this optical scanning apparatus to scan an irradiation-receiving body (such as the windshield glass) with the laser light to portray the image. That is, when the laser light from a light source unit 94 (94a, 94b) is reflected by a scanning mirror 91 having a rotational axis, the scanning with the laser light can be performed. Conceptually, modulated pixels 201 are two-dimensionally scanned on an image plane along a laser-light scan track 202 of a display surface 20.

Details of a two-dimensional polarizing function of the scanning mirror 91 in the present working example will be described below.

Figure 15:
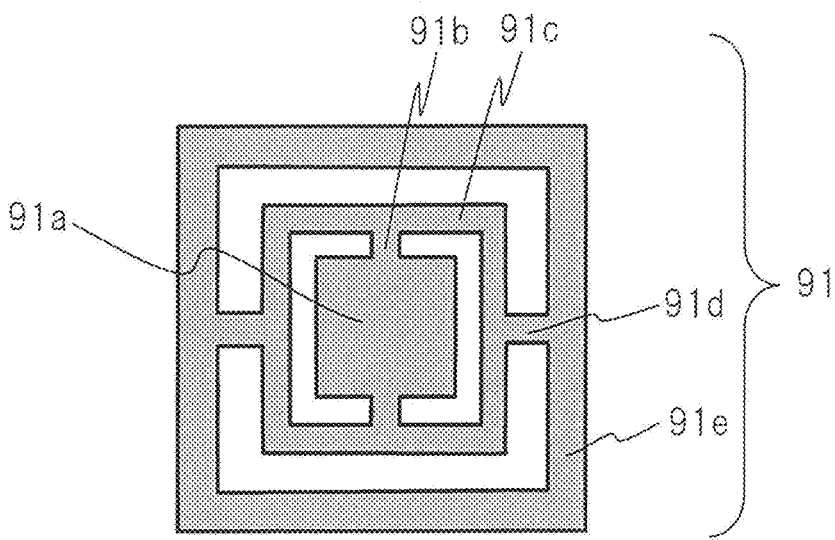
FIG. 15 is a schematic configuration diagram of a bi-axial MEMS element in a working example.

FIG. 15 is a schematic configuration diagram of the scanning mirror 91 that is a biaxial-driving MEMS element in the present working example. In the drawing, a scanning mirror surface 91a that polarizes the laser light at a reflection angle is connected to parts of a first torsion spring 91b that are coaxially opposed to each other so as to sandwich the scanning mirror surface 91a therebetween. Further, the torsion spring 91b is connected to a supporting member 91c, and the supporting member 91c is connected to a second torsion spring 91d. The second torsion spring 91d is connected to a frame 91e. And, although not illustrated, a permanent magnet and a coil are arranged at positions that are substantially symmetrical to each other across each of the torsion springs 91b and 91d. The coil is formed at a position that is substantially parallel to the scanning mirror surface 91a of the scanning mirror 91, and generates a magnetic field that is substantially parallel to the scanning mirror surface 91a when the scanning mirror surface 91a of the scanning mirror 91 is in a stop state. When electric current flows in the coil, the Lorentz force that is substantially vertical to the scanning mirror surface 91a is generated on the basis of the Fleming's left-hand rule.

The scanning mirror surface 91a rotates to reach a position at which the Lorentz force and restoring force of the torsion springs 91b and 91d are balanced to each other. For the torsion spring 91b, the scanning mirror surface 91a resonates when an alternate current is supplied to the coil at a resonance frequency of the scanning mirror surface 91a. Similarly, for the torsion spring 91d, the scanning mirror surface 91a, the torsion spring 91b and the supporting member 91c resonate when an alternate current is supplied to the coil at a resonance frequency of combination of the scanning mirror surface 91a and the supporting member 91c. In this manner, the resonance operations at the different resonance frequencies in two directions are achieved.

Figure 16:
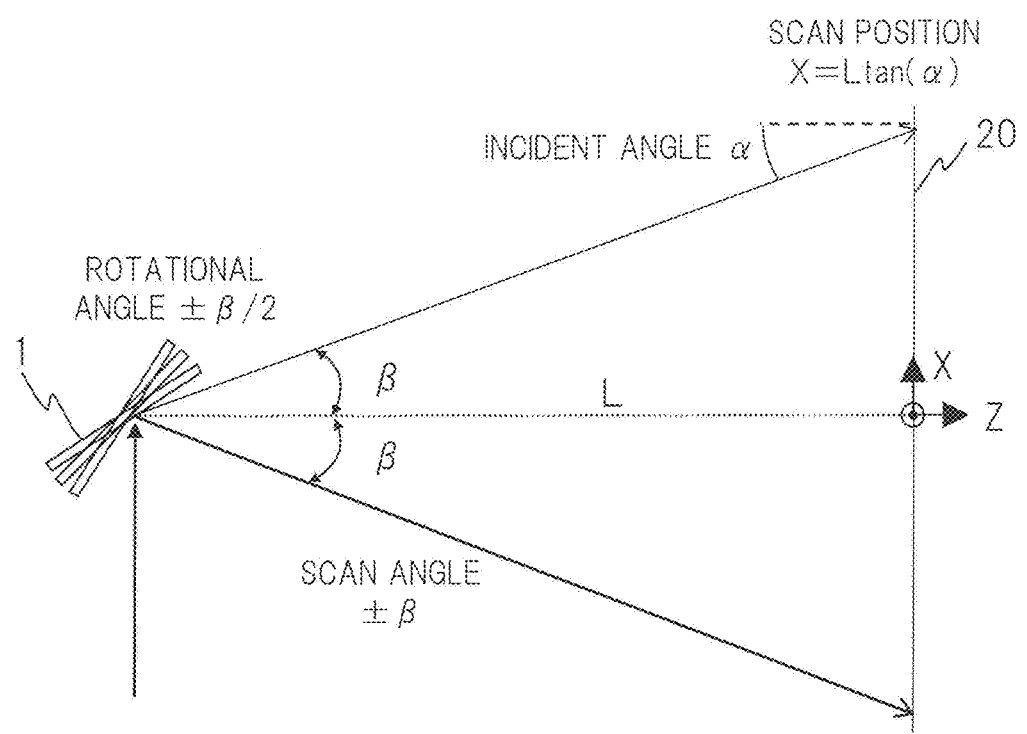
FIG. 16 is an explanatory diagram for explaining an outline of a light flux scan using a MEMS element in a working example.

In FIG. 16, when a rotational angle of the scanning mirror 91 that is the reflection surface of the optical scanning unit is set to "β/2", a scan angle that is an angle of the reflected optical rays changes by β that is twice the rotational angle. In this case, if no optical element is arranged between the scanning mirror 91 and an image plane 20, the scan angle β is equivalent to an incident angle "α" on the image plane 20. Therefore, a size of the scanned image for a certain projection distance is undesirably defined by the rotational angle β/2 of the scanning mirror 91. Therefore, in the present working example, in order to obtain a large screen for a short distance, an optical system (a concave lens or a convex mirror) is provided (but not illustrated) between the scanning mirror 91 shown in FIG. 14 and the windshield glass that is the projection surface, so that the above-described scanning amplitude is increased.

In the present working example, the distance from the viewer to the image is short because the image is overlapped with the foreground view viewed by the viewer, and therefore, it is necessary to set an image display region in the horizontal direction to be larger than that in the vertical direction. Accordingly, the inventors and others have obtained an optimum value of an image display width through practical measurement while fitting 1.2 m to the fixed distance from the driver who is the viewer to the lower portion of the windshield glass. The inventors have found out that it is necessary to set the display range in the horizontal direction to be equal to or larger than 30 inches in order to display the left/right turn of the driven car by using an arrow in accordance with the rotational angle of the steering, and have found out that more favorable image display is achieved when display having a display range over 40 inches is achieved.

On the other hand, the inventors and others have found out that clear display is achieved when the display range in the vertical direction is 10 inches. Further, while it is necessary to increase the display range up to about 20 inches in order to enhance the visual recognition for the display, the inventors and others have verified that an image that is enough on a practical level is obtained when an upper limit is set to 15 inches since the increase in the amplitude in the vertical direction needs to the decrease in the amplitude in the horizontal direction in the driving of the MEMS.

Next, a first scanning state of the laser light scanning the image plane in the present working example will be described.

Figure 17:
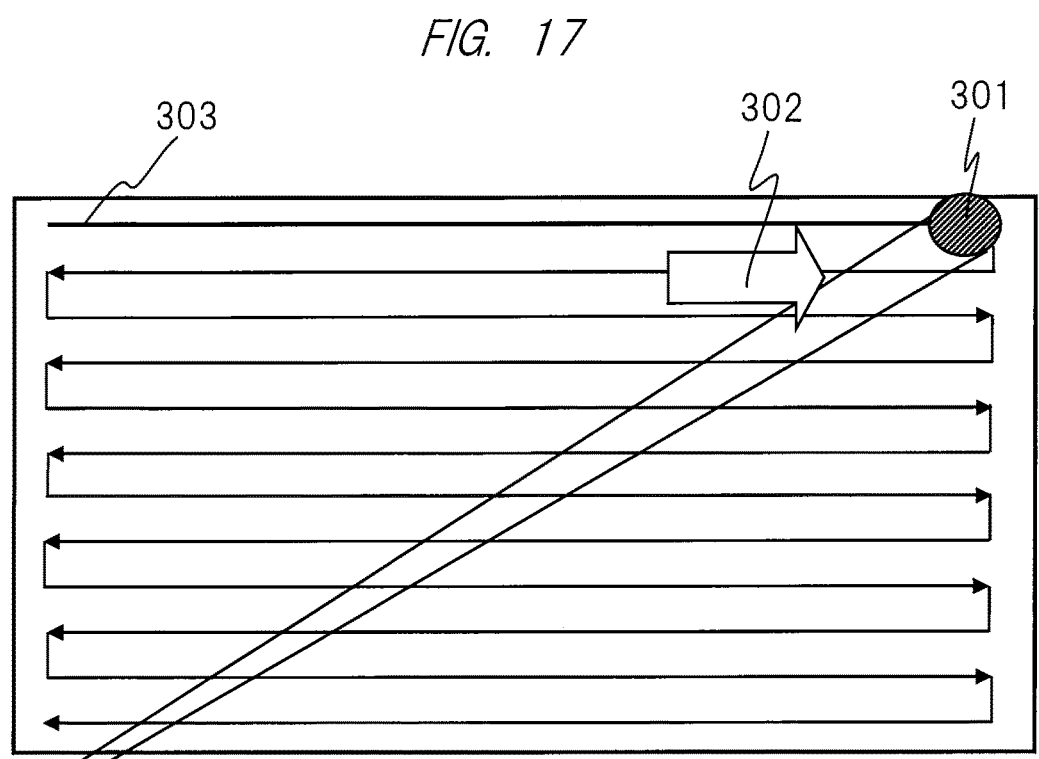
FIG. 17 is an explanatory diagram for a first scanning state of laser light with which a free curved mirror is scanned in a working example.

FIG. 17 shows the first scanning state of the laser light emitted from the optical scanning unit in the present working example. As described above, regarding the scanning range (amplitude) of the optical scanning unit in the present working example, an amplitude angle in the horizontal direction is set to be twice or more an amplitude angle in the vertical direction so that the image display range in the horizontal direction is larger than that in the vertical direction. A size of the laser light on the windshield glass is set to be one pixel, the windshield glass is scanned with the laser light 301 rightward from a left side in the horizontal direction, and then, is scanned from the right side to the left side after a scanned line is moved down by one pixel. A numerical symbol 302 indicates the scan track of the first scanning unit. A frame rate at which the image is switched may be 1/60 Hz when the driving speed of the car is 40 km/hour. However, by setting the frame rate to 1/120 Hz when the driving speed is 100 km/hour, a rewriting speed of the display image is increased in accordance with the driving speed of the car so that the optimal display is achieved.

In this case, as shown in an expression (3), the optical scanning unit in the present working example has a substantially constant value "A" as a product of a frame frequency "F", a horizontal-polarization frequency "fh" and a vertical-polarization frequency "fv". Therefore, the frame rate is changed on the basis of the driving speed information of the car acquired from the driving assistance ECU 62 shown in FIG. 1(B) so that the horizontal-polarization frequency is decreased, and the polarization angle is proportionately decreased on the basis of the expression (3).

[Numerical Expression 3]

$$A=F(fh \times fv) \tag{3}$$

As a result, although the horizontal-direction size of the image display is small as the image display range, the information display apparatus that does not cause the uncomfortableness in the usage can be obtained since a field of view of the driver is narrowed when the driving speed is high.

Figure 18:
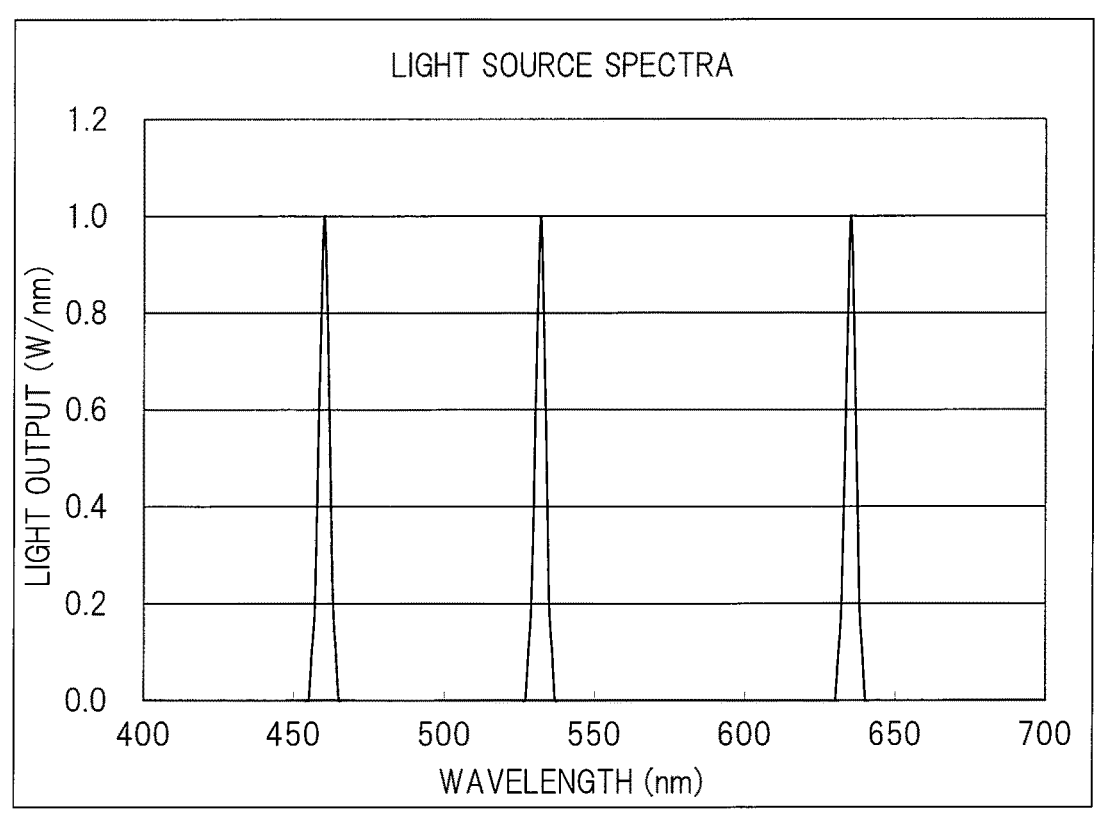
FIG. 18 is light spectra of a light source of a light scanning apparatus in a first scanning state in a working example.
Figures 19, 20:
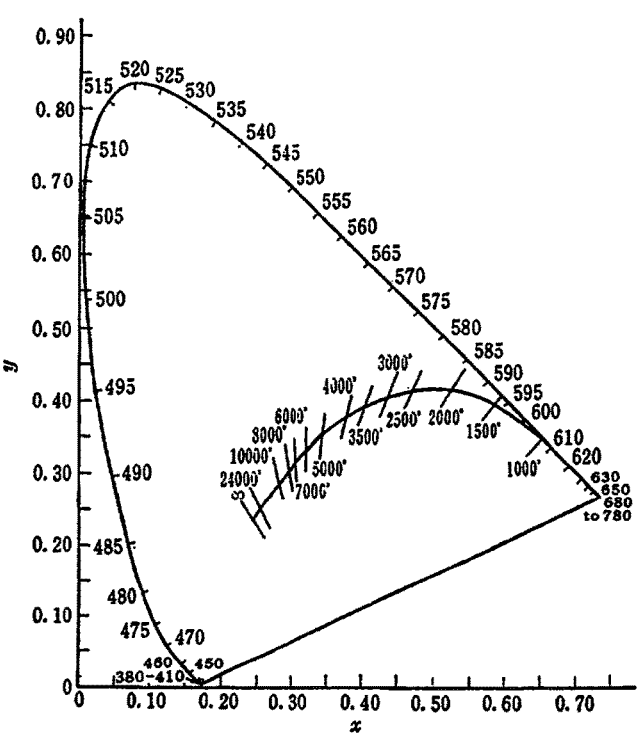
FIG. 19 is a black body locus and an isotemperature line diagram.
FIG. 20 is a diagram showing a chromaticity table of the light of the light source of the light scanning apparatus in the first scanning state in a working example.

In the first scanning state in the present working example, single-color laser light of three colors (red color (635 nm), green color (532 nm) and blue color (460 nm)) shown in FIG. 18 is used. FIG. 20 shows results of conversion of chromaticity in single-color light case and a synthesis case acquired in combination of the colors into coordinates on chromaticity diagram shown in FIG. 19, and shows that sufficient brightness has been obtained while covering a display color range of an NTSC mode since a chromatic purity of each single color is excellent.

Further, mixture of different-color light at the time of emission of each single color, such as the mixed-color light in a case of 100% emission of the blue-color laser light mixed with 10% of the maximum light emission of the green-color light at the same time as 5% of the maximum light emission of the red-color light causes a color that is equivalent to the blue color, and causes brightness that is twice or more. As described above, it has been also found out that the scanning unit of the mode of the present application can further improve the brightness of the virtual single-color light by using mixture of the different-color laser light instead of using the single-color laser light.

Next, a second scanning state of the laser light scanning the image plane in the present working example will be described.

Figure 21:
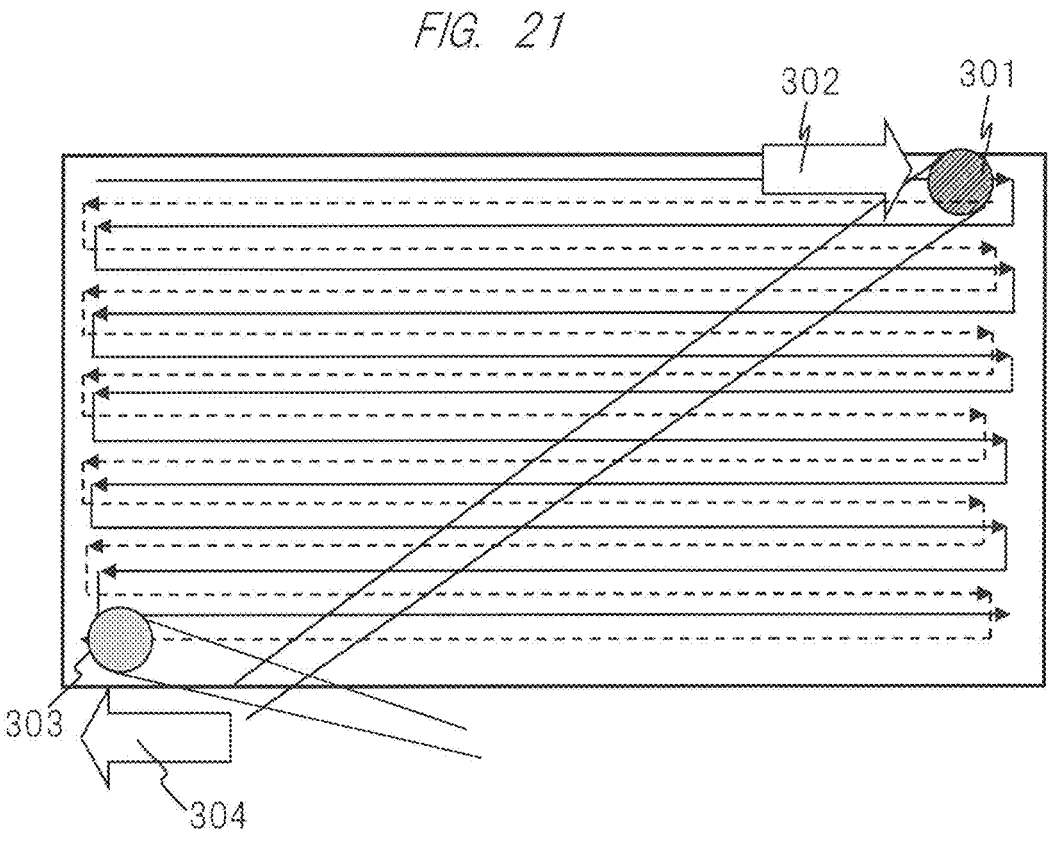
FIG. 21 is an explanatory diagram for a second scanning state of the laser light with which the free curved mirror is scanned in a working example.

FIG. 21 shows the second scanning state of the laser light emitted from the optical scanning unit in the present working example. A difference from the first scanning state is that a plurality of optical scanning units, that is, two optical scanning units that are the first scanning unit and the second scanning unit in FIG. 21 are arranged. Regarding the scanning range (amplitude) of the first scanning unit, the amplitude angle in the horizontal direction is set to twice the amplitude angle in the vertical direction or more so that the image display range in the horizontal direction is larger than that in the vertical direction. A size of the laser light 301 on the windshield glass is set to be one pixel, the windshield glass is scanned in the horizontal direction with beam, in other words, it is scanned from the left side to the right side along a track shown by a solid line in FIG. 21, and then, is scanned from the right side to the left side after a scanned line is moved down by one pixel. A numerical symbol 302 indicates the scan track of the first scanning unit.

On the other hand, regarding the scanning range (amplitude) of the second scanning unit, the amplitude angle in the horizontal direction is set to twice the amplitude angle in the vertical direction or more as similar to the first scanning unit so that the image display range in the horizontal direction is larger than that in the vertical direction. A size of the laser light 303 on the windshield glass is set to be one pixel, the windshield glass is scanned in the horizontal direction with beam, in other words, it is scanned from the right side to the left side along a track shown by a dashed line in FIG. 21, and then, is scanned from the left side to the right side after a scanned line is moved down by one pixel. Note that FIG. 21 shows a state in which the laser light 303 arrives at the last pixel on the lowest line. The scanning performed by the second scanning unit may be performed from an upper side to a lower side, or from the lower side to the upper side. A numerical symbol 304 indicates a scan track of the second scanning unit. In this case, an image of a next frame is displayed so that display of a next frame of the frame image that is displayed by the first scanning unit shifts by almost ½ frame.

Figure 22:
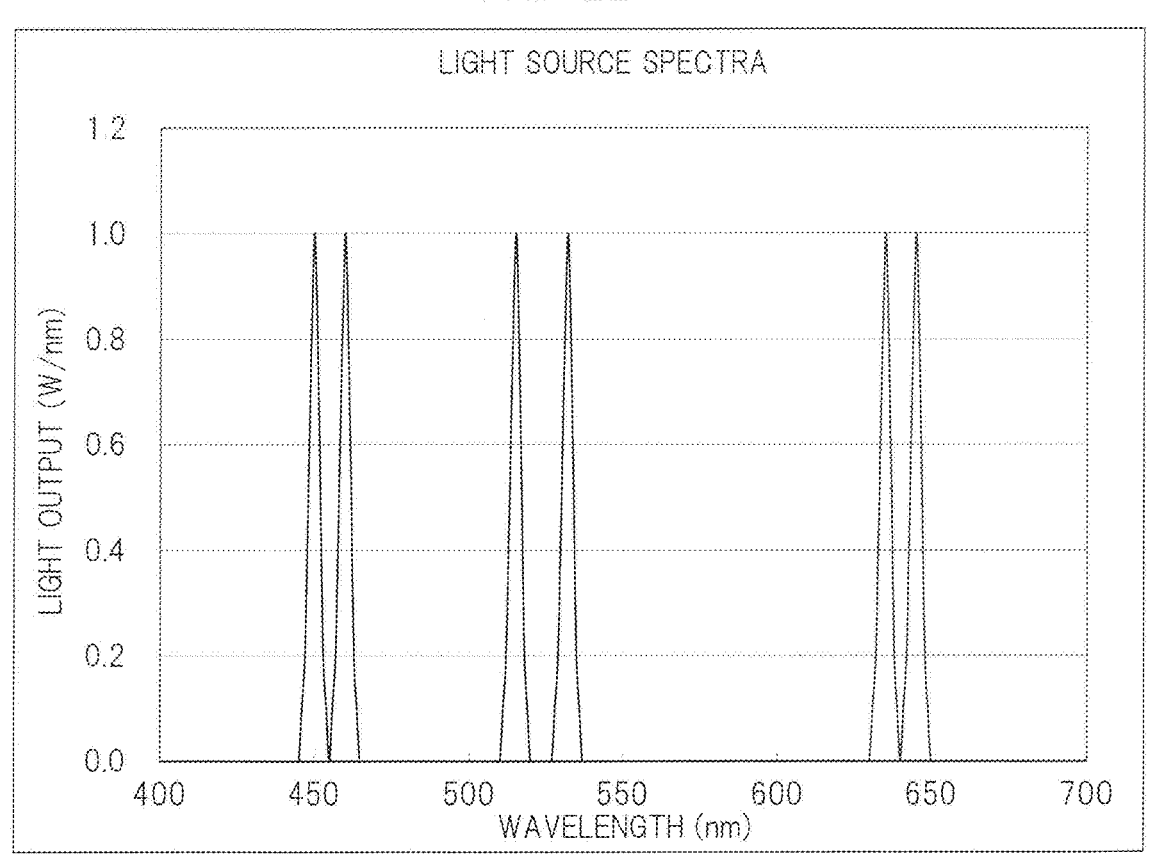
FIG. 22 is light spectra of a light source of a light scanning apparatus in a second scanning state in a working example.

As a result, the inventors have found out that the frame rate can be virtually twice. Further, in the first scanning unit in the second scanning state, single-color laser light of three colors that are red color (635 nm), green color (532 nm) and blue color (460 nm)) shown in FIG. 22 is used. And, when single-color laser light of three colors that are red color (645 nm), green color (515 nm) and blue color (450 nm) shown in FIG. 22 is used in the second scanning unit, speckle can be also reduced. And, regarding chromaticity in single-color light case and a synthesis case acquired in combination of the colors, sufficient brightness has been obtained while covering the display color range of the NTSC mode since a chromatic purity of each single color of the laser light source configuring the two scanning unit is excellent as shown in FIG. 23.

The mixture of the different-color light at the time of the single-color light emission from each of the first scanning unit (referred to as (1) below) and the second scanning unit (referred to as (2) below), such as the mixed-color light, causes a color that is equivalent to the blue color, and causes brightness that is twice the brightness of the non-mix color light or more, the mixed-color light being generated in a case of 100% emission of the blue-color laser light (1) and (2) from the two scanning unit mixed with 5% of the maximum light emission of the green-color light (1) at the same time as 10% of the maximum light emission of the green-color light (2) and 5% of the maximum light emission of the red-color light (1).

As described above, it has been found out that the present working example can further improve the brightness of the virtual single-color light by using the mixture of the different-color laser light instead of using the single-color laser light even when the plurality of scanning units are used to be overlapped. In the present working example, the effect of the case of the simultaneous usage of the two scanning units has been described. However, it is needless to say that simultaneous usage of three or more scanning units can virtually increase the frame rate, and speckle noises can be also significantly reduced by the usage and the overlap of the laser light having different wavelengths from one another for the respective scanning units. The brightness can be also improved without losing the single-color chromaticity as described above.

Subsequently, a more specific configuration of the display using the instrument panel that is the above-described information display apparatus will be described.

The instrument panel 42 shown in FIG. 1(A) is arranged on an inner radial portion of the steering 43, and therefore, the displayed image causes the largest point-of-view motion of the driver who is the viewer. Thus, except in the automatic driving of the car using the automatic driving mode, information having low urgency is displayed. When the point of view of the driver is sensed by the above-described viewing camera 210 to change the display image, a lot of image information can be effectively displayed for the driver.

In order to thin the apparatus, a liquid crystal panel is used as the instrument panel. A curved surface may be applied in important consideration of interior design of the car. When the display content is switched at a high speed so that the display speed is 120 Hz that is twice the frame rate (60 Hz) or 240 Hz that is four times the frame rate, real-time display of the image information or others from the viewing camera outside the car is achieved.

The above-described information display apparatus has the image display region 1(a), the image display region 2(a) and the image display region 3(a) as three types of the information display positions as shown in FIG. 3. On the other hand, for example, the viewing camera 210 shown in FIGS. 1 and 2 is used as a sensor for use in viewing the point-of-view motion of the driver who is the viewer. In this manner, in response to the information of the point-of-view motion of the viewer and the speed of the car, the respective images displayed at the three types of the information display positions are displayed in combination for optimal position, time and displayed content, so that the information display apparatus that is effective for the safety driving assistance can be provided. For example, control for change of the information display positions in a turning direction or others is performed in accordance with the point-of-view motion of the viewer at the time of the turning.

When display centers of the above-described three information display positions are arranged near a line including a rotational center axis of the steering, right and left point-of-view motions of the driver who is the viewer in the horizontal direction are equalized to each other, and therefore, an effect that suppresses the tiredness in the driving and an effect that minimizes the point-of-view motion can be obtained.

The information display apparatuses according to the various working examples of the present invention have been described above. However, the present invention is not limited to the above-described working examples, and include various modification examples. For example, in the above-described working examples, the entire system has been explained in detail for easily understanding the present invention, and the working examples are not always limited to the one including all structures explained above. Also, a part of the structure of one working example can be replaced with the structure of another working example, and besides, the structure of another working example can be added to the structure of one working example. Further, another structure can be added to/eliminated from/replaced with a part of the structure of each working example.

EXPLANATION OF REFERENCE CHARACTERS

1 . . . concave mirror, 1a . . . concave-mirror supporting unit, 2 and 3 . . . optical element (lens), 4 . . . image display apparatus, 6 . . . projection-receiving member (windshield glass), 8 . . . eyebox (eyes of viewer), 10 . . . backlight source, 20 . . . display surface, 41 . . . opening, 42 . . . instrument panel, 43 . . . steering, 44 . . . windshield cover, 45 . . . vehicle body, 50 . . . sun, 51, 52 and 53 . . . spatial sensing apparatus, 531 . . . converting apparatus, 60 . . . light source, 61 . . . capacitor optical element, 65 . . . light-collecting lens element, 64 . . . light receiving unit, 80 . . . sensing unit, 91 . . . scanning mirror, 100 . . . HUD apparatus, 101 . . . car, 201 . . . pixel, 202 . . . scan track of laser light, 210 . . . viewing camera, 220 . . . projection optical apparatus, 301 . . . laser light from first scanning unit, 302 . . . scan track of first scanning unit, 303 . . . laser light from second scanning unit, 304 . . . scan track of second scanning unit, 1(a), 2(a), 3(a), 1(b), 2(b) and 3(b) . . . image display region

The invention claimed is:

1. An information display apparatus displaying information onto a vehicle comprising:

a first display configured to display image information onto a first image display region on a forward part of a driver seat of the vehicle;

a spatial sensing apparatus configured to detect a position of instruction made by a driver, in a spatial region between the driver seat and the first image display region displayed by the first display; and a second display configured to display an indicator based on the instruction made by the driver, in a second image display region different from the first image display region, in accordance with the position of the instruction made by the driver and movement of the position detected by the spatial sensing apparatus, wherein the first display includes a virtual-image optical system configured to display a virtual image onto a forward part of the vehicle by allowing the windshield glass of the vehicle to reflect light emitted from the first display, wherein the second display includes a practical-image optical system configured to display a practical image by scanning the windshield glass of the vehicle with light emitted from the second display, wherein the spatial sensing apparatus includes a plurality of pairs of a capacitor optical element creating substantially-collimated light flux from a light flux emitted from a light source and a light-collecting lens element receiving, at a light receiving unit, a reflected light flux of the light flux from the capacitor optical element, the reflected light flux being reflected on obstacles, wherein the second image display region has a display range in the horizontal direction of 30 to 40 inches or more and displays an arrow in accordance with the rotational angle of a steering of the vehicle, and wherein the second display projects an image onto the second image display region by allowing a MEMS (Micro Electro Mechanical Systems) to perform scanning while using a laser light source such that a size of the laser light from the laser light source on the second image display region is one pixel and the second image display region is scanned in horizontal lines from top to bottom by moving the laser light down one pixel after each horizontal line, and wherein a member having a property of a reflectance against a S-polarized light and a reflectance against a P-polarized light that are different from each other is applied, adhered or pasted on the second image display region, so that a reflectance property against a S-polarized laser light in a visible-light range is 10% to 20%.

2. The information display apparatus according to claim 1, wherein the plurality of the pairs of the capacitor optical element and the light-collecting lens element are arranged in a predetermined direction.

3. The information display apparatus according to claim 1, wherein the display is arranged on a dashboard between the windshield glass and the driver seat.

4. The information display apparatus according to claim 1, comprising a third display including a direct-view type image display apparatus used as an instrument panel of the vehicle.

5. The information display apparatus according to claim 4, wherein the third display is arranged so that an image displayed on the third display is viewed through a void radially inward of an outer radial portion of a steering of the vehicle.

6. The information display apparatus according to claim 1, wherein the plurality of the pairs of the capacitor optical element and the light-collecting lens element are arranged between the windshield glass and the driver seat in a direction orthogonal to a direction from the driver seat to the windshield glass.

7. The information display apparatus according to claim 1, wherein the plurality of the pairs of the capacitor optical element and the light-collecting lens element are arranged along at least one side of an instrument panel of the vehicle.

* * * * *